US012633295B2

(12) United States Patent
Gao et al.

(10) Patent No.: US 12,633,295 B2
(45) Date of Patent: May 19, 2026

(54) THREE-DIMENSIONAL AUDIO SIGNAL CODING METHOD AND APPARATUS, AND ENCODER

(71) Applicant: HUAWEI TECHNOLOGIES CO., LTD., Shenzhen (CN)

(72) Inventors: Yuan Gao, Beijing (CN); Shuai Liu, Beijing (CN); Bin Wang, Shenzhen (CN); Zhe Wang, Beijing (CN); Tianshu Qu, Beijing (CN); Jiahao Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 18/511,061

(22) Filed: Nov. 16, 2023

(65) Prior Publication Data

US 2024/0087579 A1 Mar. 14, 2024

Related U.S. Application Data

(63) Continuation of application No. PCT/CN2022/091571, filed on May 7, 2022.

(30) Foreign Application Priority Data

May 17, 2021 (CN) ......................... 202110536631.5

(51) Int. Cl.
*G10L 19/008* (2013.01)
*H04S 7/00* (2006.01)

(52) U.S. Cl.
CPC .............. *G10L 19/008* (2013.01); *H04S 7/30* (2013.01); *H04S 2420/11* (2013.01)

(58) Field of Classification Search
CPC ..... G10L 19/00; G10L 19/008; H04S 2420/11
See application file for complete search history.

(56) References Cited

U.S. PATENT DOCUMENTS

2014/0307877 A1 10/2014 Sumioka et al.
2017/0105082 A1* 4/2017 Kim .......................... H04S 3/02
(Continued)

FOREIGN PATENT DOCUMENTS

CN 107147975 A 9/2017
CN 112840678 B 6/2022
(Continued)

OTHER PUBLICATIONS

Sen, Deep, et al. "Efficient compression and transportation of scene-based audio for television broadcast." Audio Engineering Society Conference: 2016 AES International Conference on Sound Field Control. Audio Engineering Society, 2016.*
(Continued)

*Primary Examiner* — Paras D Shah
(74) *Attorney, Agent, or Firm* — WOMBLE BOND DICKINSON (US) LLP

(57) ABSTRACT

This application discloses a three-dimensional audio signal coding method and apparatus, and an encoder, and relates to the multimedia field. The method includes: After determining a first quantity of virtual speakers and a first quantity of vote values based on a current frame of a three-dimensional audio signal, a candidate virtual speaker set, and a voting round quantity, the encoder selects a second quantity of representative virtual speakers for the current frame from the first quantity of virtual speakers based on the first quantity of vote values, and further encodes the current frame based on the second quantity of representative virtual speakers for the current frame to obtain a bitstream. This achieves efficient data compression.

20 Claims, 12 Drawing Sheets

(56) References Cited

U.S. PATENT DOCUMENTS

| | | | | |
|---|---|---|---|---|
| 2019/0214027 | A1 | 7/2019 | Kordon et al. | |
| 2019/0379992 | A1 | 12/2019 | Schmidt et al. | |
| 2020/0118574 | A1 | 4/2020 | Keiler et al. | |
| 2022/0377489 | A1* | 11/2022 | Herre | H04S 7/302 |

FOREIGN PATENT DOCUMENTS

| | | | |
|---|---|---|---|
| EP | 4318470 | A1 | 2/2024 |
| JP | 2014520473 | A | 8/2014 |
| JP | 2017523453 | A | 8/2017 |

OTHER PUBLICATIONS

Gutiérrez Parera, Pablo. Optimization and improvements in spatial sound reproduction systems through perceptual considerations. Diss. Universitat Politècnica de València, 2020.*

* cited by examiner

TO

THREE-DIMENSIONAL AUDIO SIGNAL CODING METHOD AND APPARATUS, AND ENCODER

CROSS-REFERENCE TO RELATED APPLICATIONS

This application is a continuation of International Application No. PCT/CN2022/091571, filed on May 7, 2022, which claims priority to Chinese Patent Application No. 202110536631.5, filed on May 17, 2021. The disclosures of the aforementioned applications are hereby incorporated by reference in their entireties.

TECHNICAL FIELD

This application relates to the multimedia field, and in particular, to a three-dimensional (3D) audio signal coding method and apparatus, and an encoder.

BACKGROUND

With rapid development of high-performance computers and signal processing technologies, listeners impose an increasingly high requirement for voice and audio experience. Immersive audio can satisfy people's requirement in this aspect. For example, a three-dimensional audio technology is widely used in wireless communication (for example, 4G/5G) voice, virtual reality/augmented reality, media audio, and other aspects. The three-dimensional audio technology is an audio technology for obtaining, processing, transmitting, rendering, and playing back a sound in a real world and three-dimensional sound field information, to provide the sound with a strong sense of space, envelopment, and immersion. This provides the listeners with an extraordinary "immersive" auditory experience.

Generally, an acquisition device (for example, a microphone) acquires a large amount of data to record the three-dimensional sound field information, and transmits a three-dimensional audio signal to a playback device (for example, a speaker or an earphone), so that the playback device plays three-dimensional audio. Because the data amount of the three-dimensional sound field information is large, a large amount of storage space is required for storing data, and a high bandwidth is required for transmitting the three-dimensional audio signal. To resolve the foregoing problem, the three-dimensional audio signal may be compressed, and compressed data may be stored or transmitted. Currently, an encoder may compress the three-dimensional audio signal by using a plurality of preconfigured virtual speakers. However, calculation complexity of performing compression coding on the three-dimensional audio signal by the encoder is high. Therefore, how to reduce calculation complexity of performing compression coding on a three-dimensional audio signal is an urgent problem to be resolved.

SUMMARY

This application provides a three-dimensional audio signal coding method and apparatus, and an encoder, to reduce calculation complexity of performing compression coding a three-dimensional audio signal.

According to a first aspect, this application provides a three-dimensional audio signal encoding method. The method may be performed by an encoder, and includes the following: after determining a first quantity of virtual speakers and a first quantity of vote values based on a current frame of a three-dimensional audio signal, a candidate virtual speaker set, and a voting round quantity, the encoder selects a second quantity of representative virtual speakers for the current frame from the first quantity of virtual speakers based on the first quantity of vote values, and further encodes the current frame based on the second quantity of representative virtual speakers for the current frame to obtain a bitstream. The second quantity is less than the first quantity, which indicates that the second quantity of representative virtual speakers for the current frame are some virtual speakers in the candidate virtual speaker set. It may be understood that the virtual speakers are in a one-to-one correspondence with the vote values. For example, the first quantity of virtual speakers include a first virtual speaker, the first quantity of vote values include a vote value of the first virtual speaker, and the first virtual speaker corresponds to the vote value of the first virtual speaker. The vote value of the first virtual speaker represents a priority of using the first virtual speaker when the current frame is encoded. The candidate virtual speaker set includes a fifth quantity of virtual speakers, the fifth quantity of virtual speakers include the first quantity of virtual speakers, the first quantity is less than or equal to the fifth quantity, the voting round quantity is an integer greater than or equal to 1, and the voting round quantity is less than or equal to the fifth quantity.

Currently, in a process of searching for a virtual speaker, the encoder uses a result of related calculation between a to-be-encoded three-dimensional audio signal and a virtual speaker as a selection measurement indicator of the virtual speaker. In addition, if the encoder transmits a virtual speaker for each coefficient, efficient data compression cannot be achieved, and heavy calculation load is caused to the encoder. According to the method for selecting a virtual speaker provided in this embodiment of this application, the encoder uses a small quantity of representative coefficients to replace all coefficients of the current frame to vote for each virtual speaker in the candidate virtual speaker set, and selects a representative virtual speaker for the current frame based on a vote value. Further, the encoder uses the representative virtual speaker for the current frame to perform compression encoding on the to-be-encoded three-dimensional audio signal, which not only effectively improves a compression rate of compressing or coding the three-dimensional audio signal, but also reduces calculation complexity of searching for the virtual speaker by the encoder, thereby reducing calculation complexity of performing compression coding the three-dimensional audio signal and reducing calculation load of the encoder.

The second quantity represents a quantity of representative virtual speakers for the current frame that are selected by the encoder. A larger second quantity indicates a larger quantity of representative virtual speakers for the current frame and more sound field information of the three-dimensional audio signal, and a smaller second quantity indicates a smaller quantity of representative virtual speakers for the current frame and less sound field information of the three-dimensional audio signal. Therefore, the second quantity may be set to control a quantity of representative virtual speakers for the current frame that are selected by the encoder. For example, the second quantity may be preset. For another example, the second quantity may be determined based on the current frame. For example, a value of the second quantity may be 1, 2, 4, or 8.

Specifically, the encoder may select the second quantity of representative virtual speakers for the current frame in either of the following two manners.

Manner 1: the encoder selects the second quantity of representative virtual speakers for the current frame from the first quantity of virtual speakers based on the first quantity of vote values and a preset threshold.

Manner 2: the encoder determines a second quantity of vote values from the first quantity of vote values based on the first quantity of vote values, and using, as the second quantity of representative virtual speakers for the current frame, a second quantity of virtual speakers that are in the first quantity of virtual speakers and that correspond to the second quantity of vote values.

In addition, the voting round quantity may be determined based on at least one of the following: a quantity of directional sound sources in the current frame of the three-dimensional audio signal, a coding rate at which the current frame is encoded, and coding complexity of encoding the current frame. A larger value of the voting round quantity indicates that the encoder can use a smaller quantity of representative coefficients to perform a plurality of times of iterative voting on the virtual speaker in the candidate virtual speaker set, and select the representative virtual speaker for the current frame based on vote values in the plurality of voting rounds, thereby improving accuracy of selecting the representative virtual speaker for the current frame.

In a possible embodiment, the encoder may determine the first quantity of virtual speakers and the first quantity of vote values based on vote values of all virtual speakers in the candidate virtual speaker set.

Specifically, when the first quantity is equal to the fifth quantity, assuming that the encoder obtains a third quantity of representative coefficients of the current frame, where the third quantity of representative coefficients include a first representative coefficient and a second representative coefficient, the encoder obtains a fifth quantity of first vote values that are of the fifth quantity of virtual speakers and that are obtained by performing the voting round quantity of rounds of voting by using the first representative coefficient, and a fifth quantity of second vote values that are of the fifth quantity of virtual speakers and that are obtained by performing the voting round quantity of rounds of voting by using the second representative coefficient. The fifth quantity of first vote values include a first vote value of the first virtual speaker, and the fifth quantity of second vote values include a second vote value of the first virtual speaker. Further, the encoder obtains respective vote values of the fifth quantity of virtual speakers based on the fifth quantity of first vote values and the fifth quantity of second vote values. It may be understood that the vote value of the first virtual speaker is obtained based on a sum of the first vote value of the first virtual speaker and the second vote value of the first virtual speaker, and the fifth quantity is equal to the first quantity. Therefore, the encoder votes, for each coefficient of the current frame, for the fifth quantity of virtual speakers included in the candidate virtual speaker set, and uses the vote values of the fifth quantity of virtual speakers included in the candidate virtual speaker set as a selection basis, to cover the fifth quantity of virtual speakers in an all-round manner, thereby ensuring accuracy of a representative virtual speaker that is for the current frame and that is selected by the encoder.

For example, that the encoder obtains a fifth quantity of first vote values that are of the fifth quantity of virtual speakers and that are obtained by performing the voting round quantity of rounds of voting by using the first representative coefficient includes: determining the fifth quantity of first vote values based on coefficients of the fifth quantity of virtual speakers and the first representative coefficient.

In another possible embodiment, the encoder may determine the first quantity of virtual speakers and the first quantity of vote values based on vote values of some virtual speakers in the candidate virtual speaker set.

Specifically, if the first quantity is less than or equal to the fifth quantity, when the first quantity of virtual speakers and the first quantity of vote values are determined based on the current frame of the three-dimensional audio signal, the candidate virtual speaker set, and the voting round quantity, a difference from the foregoing possible embodiment lies in the following: After the encoder obtains the fifth quantity of first vote values and the fifth quantity of second vote values, the encoder selects an eighth quantity of virtual speakers from the fifth quantity of virtual speakers based on the fifth quantity of first vote values, where the eighth quantity is less than the fifth quantity, which indicates that the eighth quantity of virtual speakers are some of the fifth quantity of virtual speakers; and the encoder selects a ninth quantity of virtual speakers from the fifth quantity of virtual speakers based on the fifth quantity of second vote values, where the ninth quantity is less than the fifth quantity, which indicates that the ninth quantity of virtual speakers are some of the fifth quantity of virtual speakers. Further, the encoder obtains a tenth quantity of third vote values of a tenth quantity of virtual speakers based on first vote values of the eighth quantity of virtual speakers and second vote values of the ninth quantity of virtual speakers, that is, the encoder obtains, through accumulation, vote values of virtual speakers with a same number in the eighth quantity of virtual speakers and the ninth quantity of virtual speakers. Therefore, the encoder obtains the first quantity of virtual speakers and the first quantity of vote values based on the eighth quantity of first vote values, the ninth quantity of second vote values, and the tenth quantity of third vote values. It may be understood that the first quantity of virtual speakers include the eighth quantity of virtual speakers and the ninth quantity of virtual speakers. The eighth quantity of virtual speakers include the tenth quantity of virtual speakers, and the ninth quantity of virtual speakers include the tenth quantity of virtual speakers. The tenth quantity of virtual speakers include a second virtual speaker, a third vote value of the second virtual speaker is obtained based on a sum of a first vote value of the second virtual speaker and a second vote value of the second virtual speaker, the tenth quantity is less than or equal to the eighth quantity, and the tenth quantity is less than or equal to the ninth quantity. In addition, the tenth quantity may be an integer greater than or equal to 1.

In an embodiment, there are no virtual speakers with a same number in the eighth quantity of virtual speakers and the ninth quantity of virtual speakers, that is, the tenth quantity may be equal to 0. The encoder obtains the first quantity of virtual speakers and the first quantity of vote values based on the eighth quantity of first vote values and the ninth quantity of second vote values.

In this way, the encoder selects a vote value with a large value from vote values, for each coefficient of the current frame, of the fifth quantity of virtual speakers included in the candidate virtual speaker set, and determines the first quantity of virtual speakers and the first quantity of vote values by using the vote value with a large value, thereby reducing calculation complexity of searching for a virtual speaker by the encoder while ensuring accuracy of a representative virtual speaker that is for the current frame and that is selected by the encoder.

In addition, when obtaining the third quantity of representative coefficients of the current frame, the encoder obtains a fourth quantity of coefficients of the current frame and frequency-domain feature values of the fourth quantity of coefficients; and selecting the third quantity of representative coefficients from the fourth quantity of coefficients based on the frequency-domain feature values of the fourth quantity of coefficients, where the third quantity is less than the fourth quantity, which indicates that the third quantity of representative coefficients are some of the fourth quantity of coefficients. The current frame of the three-dimensional audio signal may be a high order ambisonics (HOA) signal, and a frequency-domain feature value of a coefficient of the current frame is determined based on a coefficient of the HOA signal.

In this way, the encoder selects some coefficients from all coefficients of the current frame as representative coefficients, and uses a small quantity of representative coefficients to replace all the coefficients of the current frame to select a representative virtual speaker from the candidate virtual speaker set. Therefore, calculation complexity of searching for a virtual speaker by the encoder is effectively reduced, thereby reducing calculation complexity of performing compression coding the three-dimensional audio signal and reducing calculation load of the encoder.

When encoding the current frame based on the second quantity of representative virtual speakers for the current frame to obtain a bitstream, the encoder generates a virtual speaker signal based on the second quantity of representative virtual speakers for the current frame and the current frame, and encodes the virtual speaker signal to obtain the bitstream.

Because the frequency-domain feature value of the coefficient of the current frame represents a sound field feature of the three-dimensional audio signal, the encoder selects, based on the frequency-domain feature value of the coefficient of the current frame, a representative coefficient that is of the current frame and that has a representative sound field component, and a representative virtual speaker for the current frame selected from the candidate virtual speaker set by using the representative coefficient can fully represent the sound field feature of the three-dimensional audio signal, thereby further improving accuracy of a virtual speaker signal generated when the encoder compresses or encodes the to-be-encoded three-dimensional audio signal by using the representative virtual speaker for the current frame. In this way, a compression rate of compressing or coding the three-dimensional audio signal is improved, thereby reducing a bandwidth occupied by the encoder for transmitting the bitstream.

In an embodiment, before the encoder selects the third quantity of representative coefficients from the fourth quantity of coefficients based on the frequency-domain feature values of the fourth quantity of coefficients, the method further includes: obtaining a first correlation between the current frame and a representative virtual speaker set for a previous frame; and if the first correlation does not satisfy a reuse condition, obtaining the fourth quantity of coefficients of the current frame of the three-dimensional audio signal and the frequency-domain feature values of the fourth quantity of coefficients. The representative virtual speaker set for the previous frame includes a sixth quantity of virtual speakers, the virtual speakers included in the sixth quantity of virtual speakers are representative virtual speakers for the previous frame that are used to encode the previous frame of the three-dimensional audio signal, and the first correlation is used to determine whether to reuse the representative virtual speaker set for the previous frame when the current frame is encoded.

In this way, the encoder may first determine whether the representative virtual speaker set for the previous frame can be reused to encode the current frame. If the encoder reuses the representative virtual speaker set for the previous frame to encode the current frame, the encoder does not perform a process of searching for a virtual speaker, which effectively reduces calculation complexity of searching for a virtual speaker by the encoder, thereby reducing calculation complexity of performing compression coding the three-dimensional audio signal and reducing calculation load of the encoder. In addition, frequent changes of virtual speakers in different frames may be reduced, thereby reducing orientation continuity between the frames, improving audio stability of a reconstructed three-dimensional audio signal, and ensuring sound quality of the reconstructed three-dimensional audio signal. If the encoder cannot reuse the representative virtual speaker set for the previous frame to encode the current frame, the encoder selects a representative coefficient, uses the representative coefficient of the current frame to vote for each virtual speaker in the candidate virtual speaker set, and selects a representative virtual speaker for the current frame based on a vote value, thereby reducing calculation complexity of performing compression coding the three-dimensional audio signal and reducing calculation load of the encoder.

In an embodiment, when selecting a second quantity of representative virtual speakers for the current frame from the first quantity of virtual speakers based on the first quantity of vote, the encoder obtains, based on the first quantity of vote values and a sixth quantity of final vote values of the previous frame, a seventh quantity of final vote values of the current frame that correspond to the seventh quantity of virtual speakers and the current frame; and selecting the second quantity of representative virtual speakers for the current frame from the seventh quantity of virtual speakers based on the seventh quantity of final vote values of the current frame, where the second quantity is less than the seventh quantity, which indicates that the second quantity of representative virtual speakers for the current frame are some of the seventh quantity of virtual speakers. The seventh quantity of virtual speakers include the first quantity of virtual speakers, the seventh quantity of virtual speakers include the sixth quantity of virtual speakers, and the virtual speakers included in the sixth quantity of virtual speakers are representative virtual speakers for the previous frame that are used to encode the previous frame of the three-dimensional audio signal. The sixth quantity of virtual speakers included in the representative virtual speaker set for the previous frame are in a one-to-one correspondence with the sixth quantity of final vote values of the previous frame.

In a process of searching for a virtual speaker, because a location of a real sound source unnecessarily overlaps a location of the virtual speaker, the virtual speaker may be unable to form a one-to-one correspondence with the real sound source. In addition, in an actual complex scenario, a set with a limited quantity of virtual speakers may be unable to represent all sound sources in a sound field. In this case, virtual speakers found in different frames may frequently change, and this change obviously affects an auditory feeling of a listener, resulting in obvious discontinuity and noise in a three-dimensional audio signal obtained after decoding and reconstruction. According to the method for selecting a virtual speaker provided in this embodiment of this application, a representative virtual speaker for a previous frame is inherited, to be specific, for virtual speakers with a same number, an initial vote value of a current frame is adjusted by using a final vote value of the previous frame, so that the encoder more tends to select the representative virtual speaker for the previous frame, thereby reducing frequent changes of virtual speakers in different frames, enhancing signal orientation continuity between the frames, improving audio stability of a reconstructed three-dimensional audio signal, and ensuring sound quality of the reconstructed three-dimensional audio signal.

In an embodiment, the encoder may further acquire the current frame of the three-dimensional audio signal, to perform compression encoding on the current frame of the three-dimensional audio signal to obtain a bitstream, and transmit the bitstream to a decoder side.

According to a second aspect, this application provides a three-dimensional audio signal encoding apparatus, and the apparatus includes modules configured to perform the three-dimensional audio signal encoding method according to any one of the first aspect or the possible designs of the first aspect. For example, the three-dimensional audio signal encoding apparatus includes a virtual speaker selection module and an encoding module. The virtual speaker selection module is configured to determine a first quantity of virtual speakers and a first quantity of vote values based on a current frame of a three-dimensional audio signal, a candidate virtual speaker set, and a voting round quantity, where the virtual speakers are in a one-to-one correspondence with the vote values, the first quantity of virtual speakers include a first virtual speaker, the first quantity of vote values include a vote value of the first virtual speaker, the first virtual speaker corresponds to the vote value of the first virtual speaker, the vote value of the first virtual speaker represents a priority of using the first virtual speaker when the current frame is encoded, the candidate virtual speaker set includes a fifth quantity of virtual speakers, the fifth quantity of virtual speakers include the first quantity of virtual speakers, the voting round quantity is an integer greater than or equal to 1, and the voting round quantity is less than or equal to the fifth quantity. The virtual speaker selection module is further configured to select a second quantity of representative virtual speakers for the current frame from the first quantity of virtual speakers based on the first quantity of vote values, where the second quantity is less than the first quantity. The encoding module is configured to encode the current frame based on the second quantity of representative virtual speakers for the current frame to obtain a bitstream. These modules may perform corresponding functions in the method example in the first aspect. For details, refer to the detailed descriptions in the method example. Details are not described herein again.

According to a third aspect, this application provides an encoder. The encoder includes at least one processor and a memory. The memory is configured to store a group of computer instructions, and when executing the group of computer instructions, the processor performs the operations of the three-dimensional audio signal encoding method according to any one of the first aspect or the possible embodiments of the first aspect.

According to a fourth aspect, this application provides a system. The system includes the encoder according to the third aspect and a decoder. The encoder is configured to perform the operations of the three-dimensional audio signal encoding method according to any one of the first aspect or the possible embodiments of the first aspect, and the decoder is configured to decode a bitstream generated by the encoder.

According to a fifth aspect, this application provides a computer-readable storage medium, including computer software instructions. When the computer software instructions are run on an encoder, the encoder is enabled to perform the operations of the method according to any one of the first aspect or the possible embodiments of the first aspect.

According to a sixth aspect, this application provides a computer program product. When the computer program product is run on an encoder, the encoder is enabled to perform the operations of the method according to any one of the first aspect or the possible embodiments of the first aspect.

In this application, based on the embodiments provided in the foregoing aspects, the embodiments may be further combined to provide more embodiments.

DESCRIPTION OF EMBODIMENTS

Figure 1:
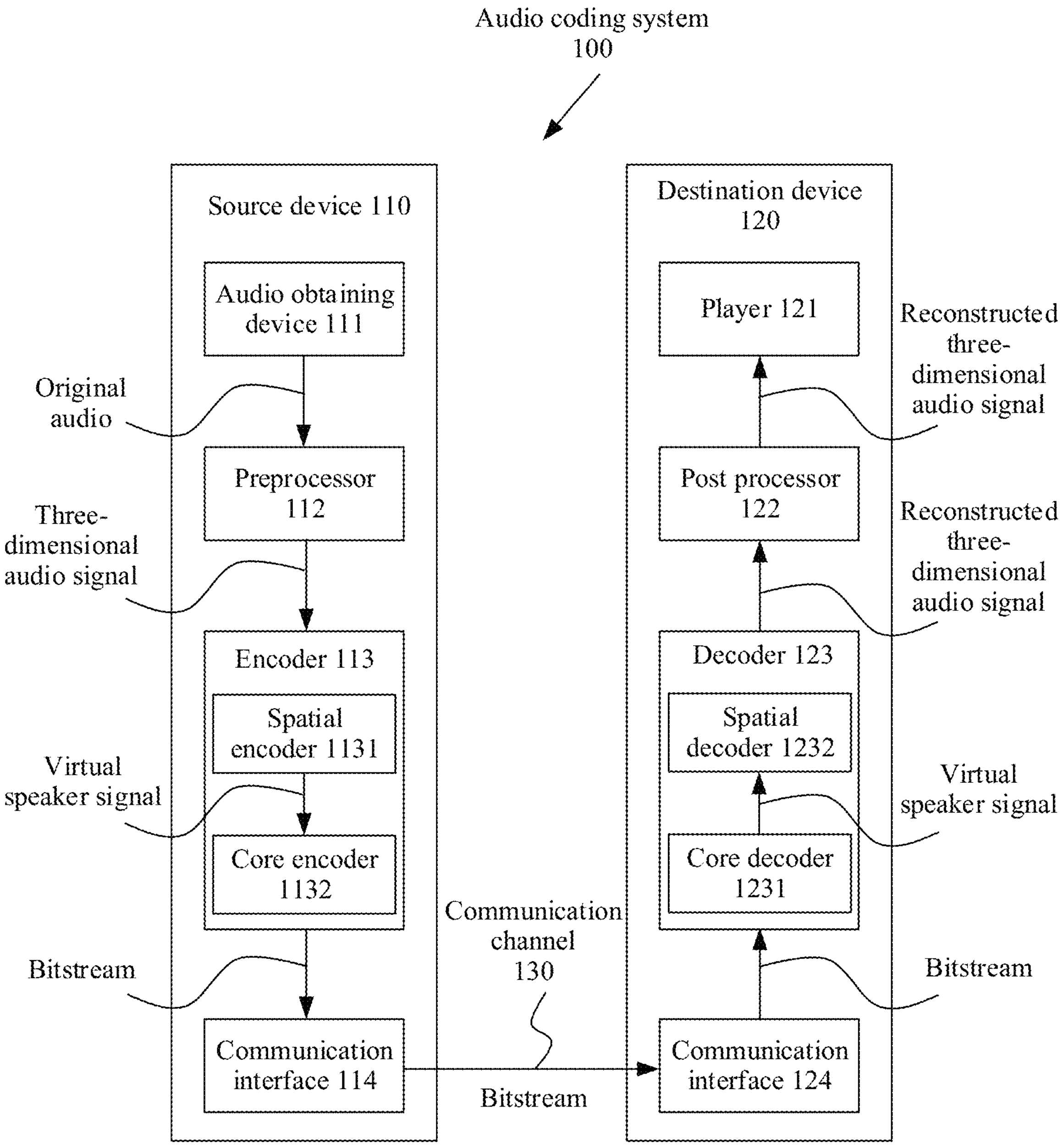
FIG. 1 is a schematic diagram of a structure of an audio coding system according to an embodiment of this application.

For clear and brief description of the following embodiments, a related technology is briefly described first.

A sound is a continuous wave generated through vibration of an object. An object that produces vibration and emits a sound wave is referred to as a sound source. In a process in which the sound wave is propagated through a medium (such as air, a solid, or liquid), an auditory organ of a human or an animal can sense the sound.

Features of the sound wave include pitch, sound intensity, and timbre. The pitch indicates highness/lowness of the sound. The sound intensity indicates a volume of the sound, the sound intensity may also be referred to as loudness or volume, and the sound intensity is in units of decibels (dB). The timbre is also referred to as sound quality.

A frequency of the sound wave determines a value of the pitch, and a higher frequency indicates a higher pitch. A quantity of times that an object vibrates in one second is referred to as the frequency, and the frequency is in units of hertz (Hz). A sound frequency that can be recognized by human ears ranges from 20 Hz to 20000 Hz.

An amplitude of the sound wave determines the sound intensity, and a larger amplitude indicates larger sound intensity. A shorter distance to the sound source indicates larger sound intensity.

A waveform of the sound wave determines the timbre. The waveform of the sound wave includes a square wave, a sawtooth wave, a sine wave, a pulse wave, and the like.

Sounds can be classified into a regular sound and an irregular sound based on features of sound waves. The irregular sound is a sound emitted through irregular vibration of a sound source. The irregular sound is, for example, noise that affects people's work, study, rest, and the like. The regular sound is a sound emitted through regular vibration of a sound source. The regular sound includes a voice and music. When the sound is represented by electricity, the regular sound is an analog signal that changes continuously in time-frequency domain. The analog signal may be referred to as an audio signal. The audio signal is an information carrier that carries a voice, music, and a sound effect.

Because a human's auditory sense has a capability of recognizing location distribution of a sound source in space, when hearing a sound in the space, a listener can sense a direction of the sound in addition to sensing pitch, sound intensity, and timbre of the sound.

As people pay increasingly more attention to auditory system experience and has an increasingly high quality requirement, to enhance a sense of depth, a sense of presence, and a sense of space that are of a sound, a three-dimensional audio technology emerges. Therefore, the listener not only feels sounds emitted from front, back, left, and right sound sources, but also feels that space in which the listener is located is surrounded by a spatial sound field ("sound field" for short) generated by these sound sources, and that the sounds spread around, thereby creating an "immersive" sound effect in which the listener feels like being in a cinema, a concert hall, or the like.

The three-dimensional audio technology means that space outside human ear is assumed as a system, and a signal received at an eardrum is a three-dimensional audio signal that is output after a sound emitted by a sound source is filtered by the system outside the ear. For example, the system outside the human ear may be defined as a system impulse response h(n), any sound source may be defined as x(n), and the signal received at the eardrum is a convolution result of x(n) and h(n). The three-dimensional audio signal in embodiments of this application may be a high order ambisonics (HOA) signal. Three-dimensional audio may also be referred to as a three-dimensional sound effect, spatial audio, three-dimensional sound field reconstruction, virtual 3D audio, binaural audio, or the like.

It is well known that when a sound wave is propagated in an ideal medium, a wave quantity is k=w/c, and an angular frequency is w=2πf, where f is a sound wave frequency, and c is a sound speed. A sound pressure P satisfies Formula (1), and $\nabla^2$ is a Laplace operator.

$$\nabla^2 p + k^2 p = 0 \qquad \text{Formula (1)}$$

It is assumed that a space system outside the human ear is a sphere, a listener is located in a center of the sphere, and a sound transmitted from the outside of the sphere has a projection on the sphere to filter out a sound outside the sphere. Assuming that a sound source is distributed on the sphere, a sound field generated by the sound source on the sphere is used to fit a sound field generated by an original sound source. In other words, the three-dimensional audio technology is a method for fitting a sound field. Specifically, the equation in Formula (1) is solved in a spherical coordinate system. In a passive spherical area, the equation in Formula (1) is solved as the following Formula (2).

$$p(r, \theta, \phi, k) = s\sum_{m=0}^{\infty}(2m+1)j^m j_m^{kr}(kr)\sum_{0<n<m, \sigma=\pm 1} Y_{m,n}^{\sigma}(\theta_s, \varphi_s) Y_{m,n}^{\sigma}(\theta, \varphi) \qquad \text{Formula (2)}$$

where r represents a sphere radius; θ represents a horizontal angle; φ represents a pitch angle; k represents a wave quantity; S represents an amplitude of an ideal plane wave; m represents an order sequence number of a three-dimensional audio signal (or referred to as an order sequence number of an HOA signal);

$$j^m j_m^{kr}(kr)$$

represents a spherical Bessel function, where the spherical Bessel function is also referred to as a radial basis function, and a first j represents an imaginary unit;

$$(2m+1)j^m j_m^{kr}(kr)$$

does not change with an angle;

$$Y_{m,n}^{\sigma}(\theta, \varphi)$$

represents a spherical harmonic function in a θ and φ direction;

$$Y_{m,n}^{\sigma}(\theta_s, \varphi_s)$$

represents a spherical harmonic function in a sound source direction; and a three-dimensional audio signal coefficient satisfies Formula (3).

$$B_{m,n}^{\sigma} = s \cdot Y_{m,n}^{\sigma}(\theta_s, \varphi_s) \qquad \text{Formula (3)}$$

Formula (3) is substituted into Formula (2), and Formula (2) may be transformed into Formula (4).

$$p(r, \theta, \varphi, k) = \sum_{m}^{\infty} j^m j_m^{kr}(kr)\sum_{0<n<m, \sigma=\pm 1} B_{m,n}^{\sigma} Y_{m,n}^{\sigma}(\theta, \varphi) \qquad \text{Formula (4)}$$

$$B_{m,n}^{\sigma}$$

represents an N-order three-dimensional audio signal coefficient, and is used to approximately describe a sound field. The sound field is an area in which a sound wave exists in a medium. N is an integer greater than or equal to 1, for example, a value of N is an integer ranging from 2 to 6. The three-dimensional audio signal coefficient in embodiments of this application may be an HOA coefficient or an ambisonic coefficient.

The three-dimensional audio signal is an information carrier that carries spatial location information of a sound source in a sound field, and describes a sound field of a listener in space. Formula (4) shows that the sound field may expand on the sphere according to the spherical harmonic function, that is, the sound field may be decomposed into superposition of a plurality of plane waves. Therefore, the sound field described by the three-dimensional audio signal may be expressed by superposition of a plurality of plane waves, and the sound field is reconstructed by using the three-dimensional audio signal coefficient.

Compared with a 5.1-channel audio signal or a 7.1-channel audio signal, because the N-order HOA signal has $(N+1)^2$ channels, the HOA signal includes a large amount of data used to describe spatial information of a sound field. If an acquisition device (for example, a microphone) transmits the three-dimensional audio signal to a playback device (for example, a speaker), a large bandwidth needs to be consumed. Currently, an encoder may perform compression coding on the three-dimensional audio signal by using spatially squeezed surround audio coding (S3AC) or directional audio coding (DirAC) to obtain a bitstream, and transmit the bitstream to the playback device. The playback device decodes the bitstream, reconstructs the three-dimensional audio signal, and plays a reconstructed three-dimensional audio signal. Therefore, an amount of data of the three-dimensional audio signal transmitted to the playback device is decreased, and bandwidth occupation is reduced. However, calculation complexity of performing compression coding the three-dimensional audio signal by the encoder is high, and excessive computing resources of the encoder are occupied. Therefore, how to reduce calculation complexity of performing compression coding a three-dimensional audio signal is an urgent problem to be resolved.

Embodiments of this application provide an audio coding technology, and in particular, provide a three-dimensional audio coding technology oriented to a three-dimensional audio signal, and specifically, provide a coding technology in which fewer channels represent a three-dimensional audio signal, so as to improve a conventional audio coding system. Video coding (or usually referred to as coding) includes two parts: video encoding and video decoding. When being performed on a source side, audio coding usually includes processing (for example, compressing) original audio to decrease an amount of data required to represent the original audio, thereby more efficiently storing and/or transmitting the original audio. When being performed on a destination side, audio decoding usually includes inverse processing relative to an encoder to reconstruct the original audio. The coding part and the decoding part may also be jointly referred to as coding. The following describes embodiments of embodiments of this application in detail with reference to the accompanying drawings.

FIG. 1 is a schematic diagram of a structure of an audio coding system according to an embodiment of this application. The audio coding system 100 includes a source device 110 and a destination device 120. The source device 110 is configured to perform compression encoding on a three-dimensional audio signal to obtain a bitstream, and transmit the bitstream to the destination device 120. The destination device 120 decodes the bitstream, reconstructs the three-dimensional audio signal, and plays a reconstructed three-dimensional audio signal.

Specifically, the source device 110 includes an audio obtaining device 111, a preprocessor 112, an encoder 113, and a communication interface 114.

The audio obtaining device 111 is configured to obtain original audio. The audio obtaining device 111 may be any type of audio acquisition device configured to acquire a sound in a real world, and/or any type of audio generation device. The audio obtaining device 111 is, for example, a computer audio processor configured to generate computer audio. The audio obtaining device 111 may alternatively be any type of memory or memory that stores audio. The audio includes a sound in a real world, a sound in a virtual scene (for example, VR or augmented reality (AR)), and/or any combination thereof.

The preprocessor 112 is configured to receive the original audio acquired by the audio obtaining device 111, and preprocess the original audio to obtain a three-dimensional audio signal. For example, preprocessing performed by the preprocessor 112 includes channel conversion, audio format conversion, noise reduction, or the like.

The encoder 113 is configured to receive the three-dimensional audio signal generated by the preprocessor 112, and perform compression coding the three-dimensional audio signal to obtain a bitstream. For example, the encoder 113 may include a spatial encoder 1131 and a core encoder 1132. The spatial encoder 1131 is configured to select (or referred to as "search for") a virtual speaker from a candidate virtual speaker set based on the three-dimensional audio signal, and generate a virtual speaker signal based on the three-dimensional audio signal and the virtual speaker. The virtual speaker signal may also be referred to as a playback signal. The core encoder 1132 is configured to encode the virtual speaker signal to obtain a bitstream.

The communication interface 114 is configured to receive the bitstream generated by the encoder 113, and send the bitstream to the destination device 120 through a communication channel 130, so that the destination device 120 reconstructs the three-dimensional audio signal based on the bitstream.

The destination device 120 includes a player 121, a post processor 122, a decoder 123, and a communication interface 124.

The communication interface 124 is configured to receive the bitstream sent by the communication interface 114, and transmit the bitstream to the decoder 123, so that the decoder 123 reconstructs the three-dimensional audio signal based on the bitstream.

The communication interface 114 and the communication interface 124 may be configured to send or receive related data of the original audio by using a direct communication link between the source device 110 and the destination device 120, for example, a direct wired or wireless connection; or by using any type of network, for example, a wired network, a wireless network, or any combination thereof, any type of private network and public network, or any type of combination thereof.

Both the communication interface 114 and the communication interface 124 may be configured as unidirectional communication interfaces indicated by an arrow of the corresponding communication channel 130 in FIG. 1 pointing from the source device 110 to the destination device 120, or bidirectional communication interfaces, and may be configured to send and receive a message or the like to establish a connection, acknowledge and exchange any other information related to the communication link and/or data transmission, for example, coded bitstream transmission.

The decoder 123 is configured to decode the bitstream, and reconstruct the three-dimensional audio signal. For example, the decoder 123 includes a core decoder 1231 and a spatial decoder 1232. The core decoder 1231 is configured to decode the bitstream to obtain the virtual speaker signal. The spatial decoder 1232 is configured to reconstruct the three-dimensional audio signal based on the candidate virtual speaker set and the virtual speaker signal to obtain a reconstructed three-dimensional audio signal.

The post processor 122 is configured to receive the reconstructed three-dimensional audio signal generated by the decoder 123, and perform post-processing on the reconstructed three-dimensional audio signal. For example, post-processing performed by the post processor 122 includes audio rendering, loudness normalization, user interaction, audio format conversion, noise reduction, or the like.

The player 121 is configured to play a reconstructed sound based on the reconstructed three-dimensional audio signal.

It should be noted that the audio obtaining device 111 and the encoder 113 may be integrated into one physical device, or may be disposed on different physical devices. This is not limited. For example, the source device 110 shown in FIG. 1 includes the audio obtaining device 111 and the encoder 113, which indicates that the audio obtaining device 111 and the encoder 113 are integrated into one physical device. In this case, the source device 110 may also be referred to as an acquisition device. For example, the source device 110 is a media gateway of a radio access network, a media gateway of a core network, a transcoding device, a media resource server, an AR device, a VR device, a microphone, or another audio acquisition device. If the source device 110 does not include the audio obtaining device 111, it indicates that the audio obtaining device 111 and the encoder 113 are two different physical devices, and the source device 110 may obtain the original audio from another device (for example, an audio acquisition device or an audio storage device).

In addition, the player 121 and the decoder 123 may be integrated into one physical device, or may be disposed on different physical devices. This is not limited. For example, the destination device 120 shown in FIG. 1 includes the player 121 and the decoder 123, which indicates that the player 121 and the decoder 123 are integrated on one physical device. In this case, the destination device 120 may also be referred to as a playback device, and the destination device 120 has functions of decoding and playing reconstructed audio. For example, the destination device 120 is a speaker, an earphone, or another device playing audio. If the destination device 120 does not include the player 121, it indicates that the player 121 and the decoder 123 are two different physical devices. After decoding the bitstream and reconstructing the three-dimensional audio signal, the destination device 120 transmits the reconstructed three-dimensional audio signal to another playing device (for example, a speaker or an earphone), and the another playing device plays back the reconstructed three-dimensional audio signal.

In addition, FIG. 1 shows that the source device 110 and the destination device 120 may be integrated into one physical device, and the source device 110 and the destination device 120 may alternatively be disposed on different physical devices. This is not limited.

Figure 2:
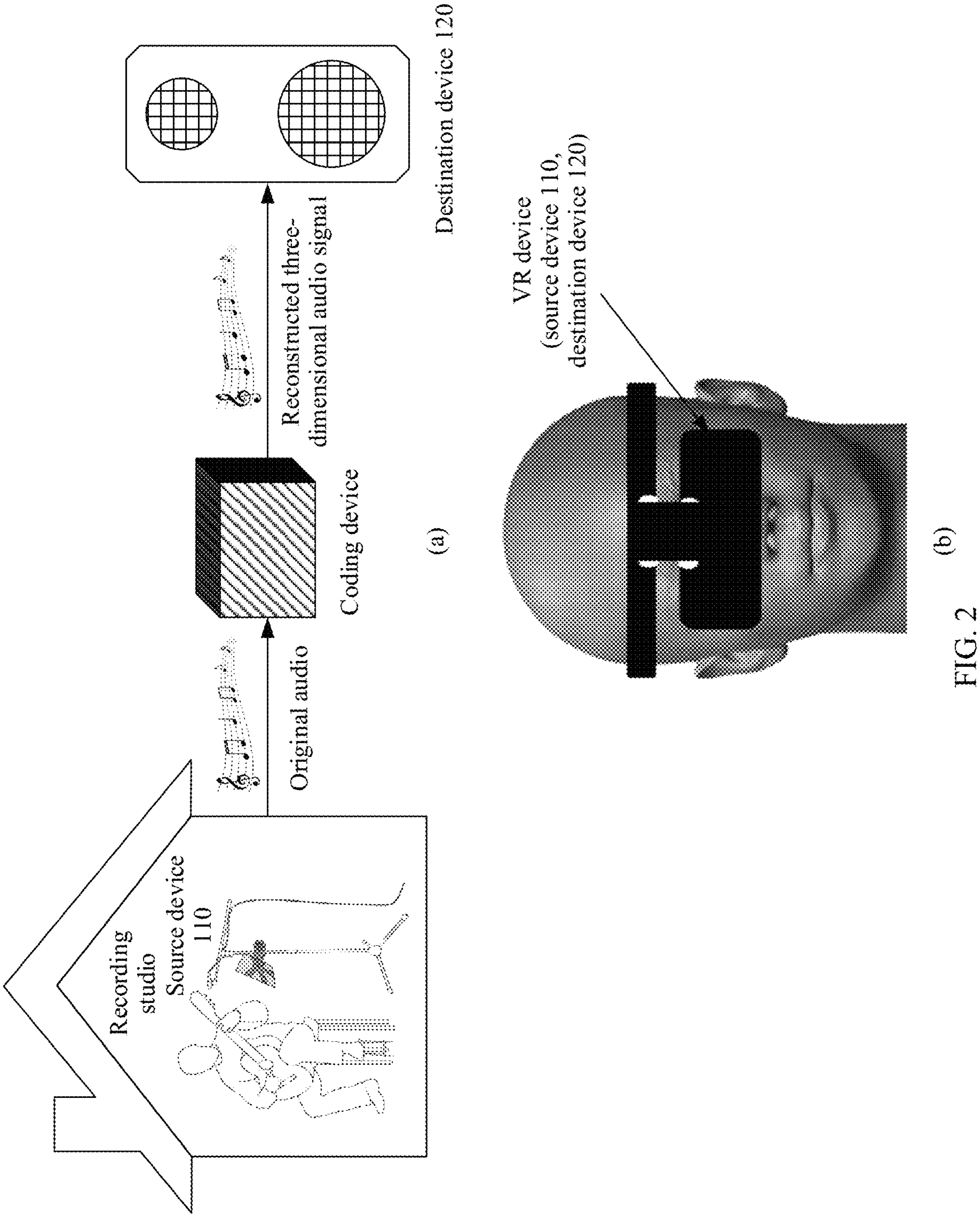
FIG. 2 is a schematic diagram of a scenario of an audio coding system according to an embodiment of this application.

For example, as shown in (a) in FIG. 2, the source device 110 may be a microphone in a recording studio, and the destination device 120 may be a speaker. The source device 110 may acquire original audio of various musical instruments, and transmit the original audio to a coding device. The coding device encodes and decodes the original audio to obtain a reconstructed three-dimensional audio signal, and the destination device 120 plays back the reconstructed three-dimensional audio signal. For another example, the source device 110 may be a microphone in a terminal device, and the destination device 120 may be an earphone. The source device 110 may acquire an external sound or audio synthesized by the terminal device.

For another example, as shown in (b) in FIG. 2, the source device 110 and the destination device 120 are integrated into a virtual reality (VR) device, an augmented reality (AR) device, a mixed reality (MR) device, or an extended reality (XR) device. In this case, the VR/AR/MR/XR device has functions of acquiring original audio, playing back audio, and coding. The source device 110 may acquire a sound emitted by a user and a sound emitted by a virtual object in a virtual environment in which the user is located.

In these embodiments, the source device 110 or corresponding functions of the source device 110 and the destination device 120 or corresponding functions of the destination device 120 may be implemented by using same hardware and/or software, by using separate hardware and/or software, or by using any combination thereof. According to the description, it is apparent for a skilled person that, existence and division of different units or functions in the source device 110 and/or the destination device 120 shown in FIG. 1 may vary depending on an actual device and application.

The structure of the audio coding system is merely an example for description. In some possible embodiments, the audio coding system may further include another device. For example, the audio coding system may further include an end-side device or a cloud-side device. After acquiring the original audio, the source device 110 preprocesses the original audio to obtain a three-dimensional audio signal, and transmits the three-dimensional audio signal to the end-side device or the cloud-side device, and the end-side device or the cloud-side device implements a function of coding and decoding the three-dimensional audio signal.

Figure 3:
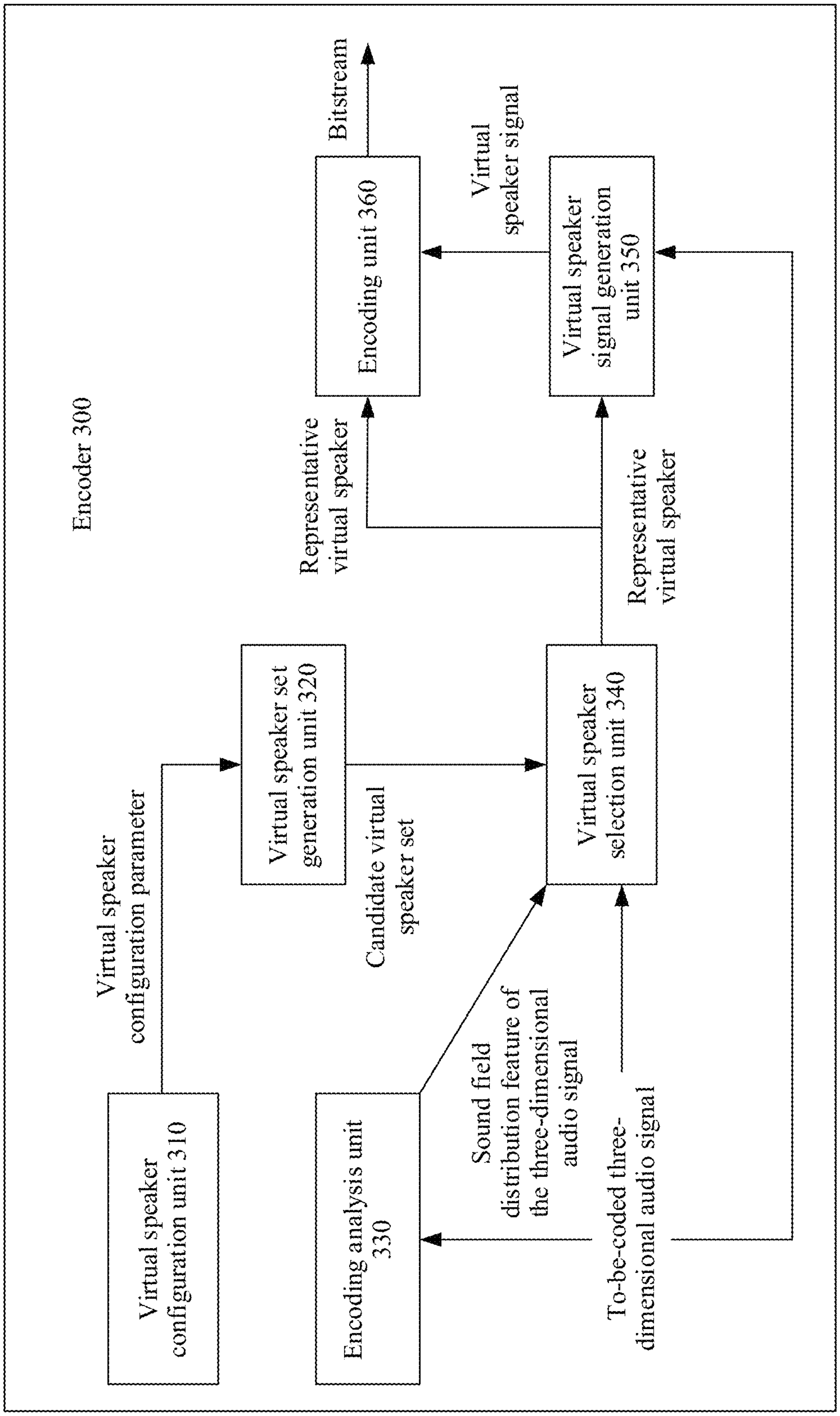
FIG. 3 is a schematic diagram of a structure of an encoder according to an embodiment of this application.

The audio signal coding method provided in embodiments of this application is mainly applied to an encoder side. A structure of an encoder is described in detail with reference to FIG. 3. As shown in FIG. 3, the encoder 300 includes a virtual speaker configuration unit 310, a virtual speaker set generation unit 320, a coding analysis unit 330, a virtual speaker selection unit 340, a virtual speaker signal generation unit 350, and an encoding unit 360.

The virtual speaker configuration unit 310 is configured to generate a virtual speaker configuration parameter based on encoder configuration information, to obtain a plurality of virtual speakers. The encoder configuration information includes but is not limited to an order (or usually referred to as an HOA order) of a three-dimensional audio signal, a coding bit rate, user-defined information, and the like. The virtual speaker configuration parameter includes but is not limited to a quantity of virtual speakers, an order of the virtual speaker, and location coordinates of the virtual speaker. For example, the quantity of virtual speakers is 2048, 1669, 1343, 1024, 530, 512, 256, 128, or 64. The order of the virtual speaker may be any one of an order 2 to an order 6. The location coordinates of the virtual speaker include a horizontal angle and a pitch angle.

The virtual speaker configuration parameter output by the virtual speaker configuration unit 310 is used as an input of the virtual speaker set generation unit 320.

The virtual speaker set generation unit 320 is configured to generate a candidate virtual speaker set based on the virtual speaker configuration parameter, where the candidate virtual speaker set includes a plurality of virtual speakers. Specifically, the virtual speaker set generation unit 320 determines, based on the quantity of virtual speakers, the plurality of virtual speakers included in the candidate virtual speaker set, and determines a coefficient of the virtual speaker based on location information (for example, the coordinates) of the virtual speaker and the order of the virtual speaker. For example, a method for determining coordinates of a virtual speaker includes but is not limited to the following: A plurality of virtual speakers are generated according to an equidistance rule, or a plurality of virtual speakers that are not evenly distributed are generated based on an auditory perception principle; and then coordinates of the virtual speaker are generated based on a quantity of virtual speakers.

The coefficient of the virtual speaker may also be generated based on the foregoing principle of generating a three-dimensional audio signal. $\theta_s$ and $\varphi_s$ in Formula (3) are respectively set to the location coordinates of the virtual speaker, and $$B_{m,n}^{\sigma}$$

represents a coefficient of an N-order virtual speaker. The coefficient of the virtual speaker may also be referred to as an ambisonics coefficient.

The coding analysis unit 330 is configured to perform coding analysis on the three-dimensional audio signal, for example, analyze a sound field distribution feature of the three-dimensional audio signal, that is, features such as a quantity of sound sources of the three-dimensional audio signal, directivity of the sound source, and dispersion of the sound source.

Coefficients of the plurality of virtual speakers included in the candidate virtual speaker set output by the virtual speaker set generation unit 320 are used as inputs of the virtual speaker selection unit 340.

The sound field distribution feature that is of the three-dimensional audio signal and that is output by the coding analysis unit 330 is used as inputs of the virtual speaker selection unit 340.

The virtual speaker selection unit 340 is configured to determine, based on a to-be-encoded three-dimensional audio signal, the sound field distribution feature of the three-dimensional audio signal, and the coefficients of the plurality of virtual speakers, a representative virtual speaker that matches the three-dimensional audio signal.

Without a limitation, the encoder 300 in this embodiment of this application may alternatively not include the coding analysis unit 330, to be specific, the encoder 300 may not analyze an input signal, and the virtual speaker selection unit 340 determines a representative virtual speaker through a default configuration. For example, the virtual speaker selection unit 340 determines, based on only the three-dimensional audio signal and the coefficients of the plurality of virtual speakers, a representative virtual speaker that matches the three-dimensional audio signal.

The encoder 300 may use, as an input of the encoder 300, a three-dimensional audio signal obtained from an acquisition device or a three-dimensional audio signal synthesized by using an artificial audio object. In addition, the three-dimensional audio signal input to the encoder 300 may be a time-domain three-dimensional audio signal or a frequency-domain three-dimensional audio signal. This is not limited.

Location information of the representative virtual speaker and a coefficient of the representative virtual speaker that are output by the virtual speaker selection unit 340 are used as inputs of the virtual speaker signal generation unit 350 and the encoding unit 360.

The virtual speaker signal generation unit 350 is configured to generate a virtual speaker signal based on the three-dimensional audio signal and attribute information of the representative virtual speaker. The attribute information of the representative virtual speaker includes at least one of the following: the location information of the representative virtual speaker, the coefficient of the representative virtual speaker, and a coefficient of the three-dimensional audio signal. If the attribute information is the location information of the representative virtual speaker, the coefficient of the representative virtual speaker is determined based on the location information of the representative virtual speaker; and if the attribute information includes the coefficient of the three-dimensional audio signal, the coefficient of the representative virtual speaker is determined based on the coefficient of the three-dimensional audio signal. Specifically, the virtual speaker signal generation unit 350 calculates the virtual speaker signal based on the coefficient of the three-dimensional audio signal and the coefficient of the representative virtual speaker.

For example, it is assumed that a matrix A represents the coefficient of the virtual speaker, and a matrix X represents a coefficient of an HOA signal. The matrix X is an inverse matrix of the matrix A. A theoretical optimal solution w is obtained by using a least squares method, where w represents the virtual speaker signal. The virtual speaker signal satisfies Formula (5).

$$w = A^{-1}X \qquad \text{Formula (5)}$$

$A^{-1}$ represents an inverse matrix of the matrix A. A size of the matrix A is (M×C). C represents the quantity of virtual speakers, M represents a quantity of sound channels of the N-order HOA signal, a represents the coefficient of the virtual speaker, a size of the matrix X is (M×L), L represents a quantity of coefficients of the HOA signal, and x represents the coefficient of the HOA signal. The coefficient of the representative virtual speaker may be an HOA coefficient of the representative virtual speaker or an ambisonics coefficient of the representative virtual speaker. For example, $$A = \begin{bmatrix} a_{11} & \dots & a_{1C} \\ \vdots & \ddots & \vdots \\ a_{M1} & \dots & a_{MC} \end{bmatrix}, \text{ and } X = \begin{bmatrix} x_{11} & \dots & x_{1L} \\ \vdots & \ddots & \vdots \\ x_{M1} & \dots & x_{ML} \end{bmatrix}$$

The virtual speaker signal output by the virtual speaker signal generation unit 350 is used as an input of the encoding unit 360.

The encoding unit 360 is configured to perform core encoding processing on the virtual speaker signal to obtain a bitstream. The core coding processing includes but is not limited to transformation, quantization, a psychoacoustic model, noise shaping, bandwidth expansion, downmixing, arithmetic coding, bitstream generation, and the like.

It should be noted that the spatial encoder 1131 may include the virtual speaker configuration unit 310, the virtual speaker set generation unit 320, the coding analysis unit 330, the virtual speaker selection unit 340, and the virtual speaker signal generation unit 350, that is, the virtual speaker configuration unit 310, the virtual speaker set generation unit 320, the coding analysis unit 330, the virtual speaker selection unit 340, and the virtual speaker signal generation unit 350 implement functions of the spatial encoder 1131. The core encoder 1132 may include the encoding unit 360, that is, the encoding unit 360 implements functions of the core encoder 1132.

The encoder shown in FIG. 3 may generate one virtual speaker signal, or may generate a plurality of virtual speaker signals. The plurality of virtual speaker signals may be obtained by the encoder shown in FIG. 3 through a plurality of executions, or may be obtained by the encoder shown in FIG. 3 through one execution.

Figure 4:
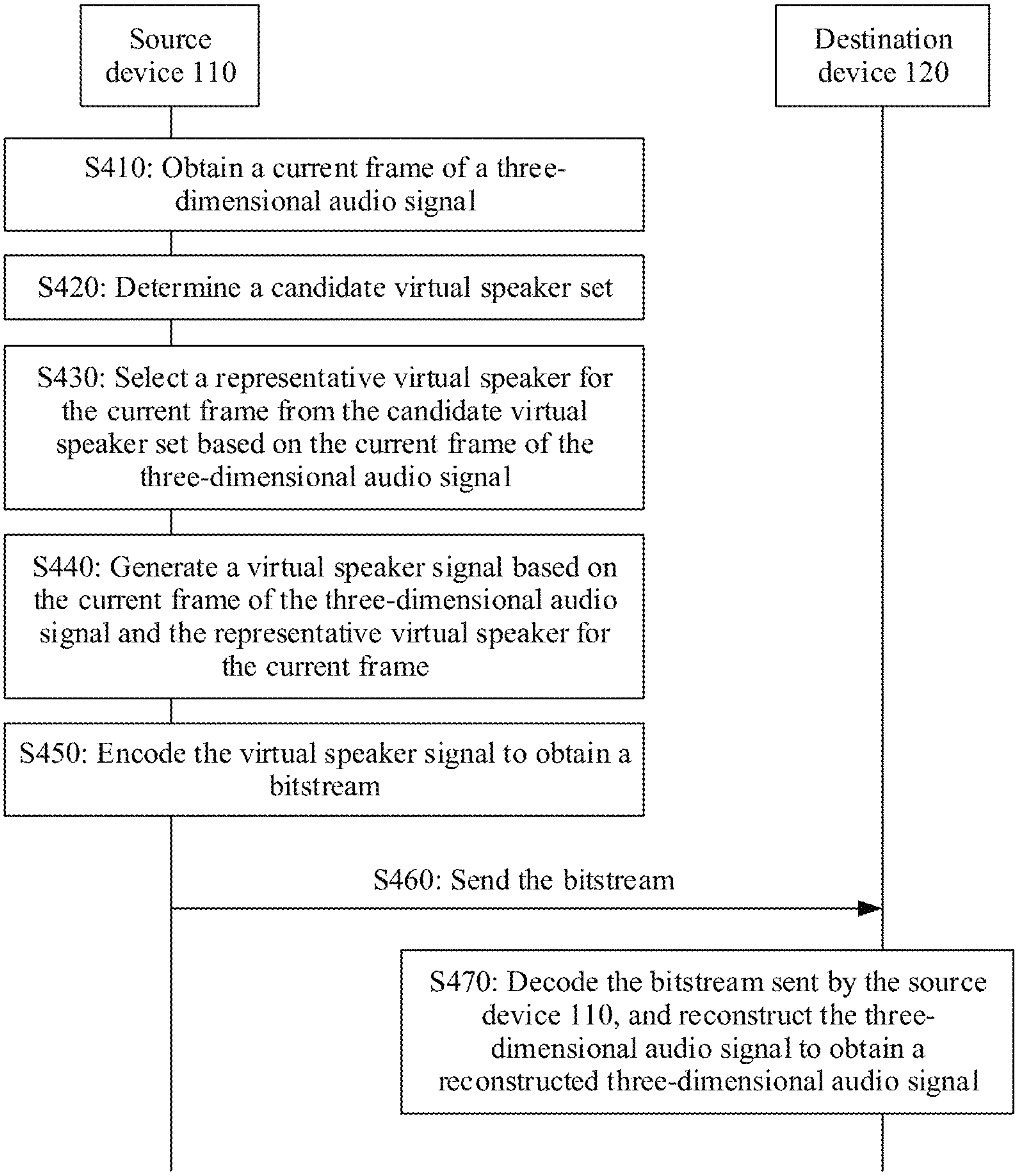
FIG. 4 is a schematic flowchart of a three-dimensional audio signal encoding method according to an embodiment of this application.

The following describes a process of coding a three-dimensional audio signal with reference to the accompanying drawings. FIG. 4 is a schematic flowchart of a three-dimensional audio signal encoding method according to an embodiment of this application. Herein, a description is provided by using an example in which the source device 110 and the destination device 120 in FIG. 1 perform a three-dimensional audio signal coding process. As shown in FIG. 4, the method includes the following operations.

S410: The source device 110 obtains a current frame of a three-dimensional audio signal.

As described in the foregoing embodiment, if the source device 110 carries the audio obtaining device 111, the source device 110 may acquire original audio by using the audio obtaining device 111. In an embodiment, the source device 110 may alternatively receive original audio acquired by another device, or obtain original audio from a memory in the source device 110 or another memory. The original audio may include at least one of the following: a sound in a real world acquired in real time, audio stored in a device, and audio synthesized by a plurality of pieces of audio. A manner of obtaining the original audio and a type of the original audio are not limited in this embodiment.

After obtaining the original audio, the source device 110 generates a three-dimensional audio signal based on a three-dimensional audio technology and the original audio, to provide a listener with an "immersive" sound effect during playback of the original audio. For a specific method for generating the three-dimensional audio signal, refer to the description of the preprocessor 112 in the foregoing embodiment and description of the conventional technology.

In addition, an audio signal is a continuous analog signal. In an audio signal processing process, the audio signal may be first sampled to generate a digital signal of a frame sequence. A frame may include a plurality of sampling points, the frame may alternatively be a sampling point obtained through sampling, the frame may alternatively include a subframe obtained by dividing the frame, and the frame may alternatively be a subframe obtained by dividing the frame. For example, if a length of a frame is L sampling points, and the frame is divided into N subframes, each subframe corresponds to L/N sampling points. Audio coding usually means to process an audio frame sequence including a plurality of sampling points.

An audio frame may include a current frame or a previous frame. The current frame or the previous frame described in embodiments of this application may be a frame or a subframe. The current frame is a frame on which coding processing is performed at a current moment. The previous frame is a frame on which coding processing has been performed at a moment before the current moment, and the previous frame may be a frame at one moment before the current moment or frames at a plurality of moments before the current moment. In this embodiment of this application, the current frame of the three-dimensional audio signal is a frame of three-dimensional audio signal on which coding processing is performed at a current moment, and the previous frame is a frame of three-dimensional audio signal on which coding processing has been performed at a moment before the current time. The current frame of the three-dimensional audio signal may be a to-be-encoded current frame of the three-dimensional audio signal. The current frame of the three-dimensional audio signal may be referred to as the current frame for short, and the previous frame of the three-dimensional audio signal may be referred to as the previous frame for short.

S420: The source device 110 determines a candidate virtual speaker set.

In one case, the candidate virtual speaker set is preconfigured in a memory of the source device 110. The source device 110 may read the candidate virtual speaker set from the memory. The candidate virtual speaker set includes a plurality of virtual speakers. The virtual speaker represents a speaker exists in a spatial sound field in a virtual manner. The virtual speaker is configured to calculate a virtual speaker signal based on the three-dimensional audio signal, so that the destination device 120 plays back a reconstructed three-dimensional audio signal.

In another case, a virtual speaker configuration parameter is preconfigured in the memory of the source device 110. The source device 110 generates the candidate virtual speaker set based on the virtual speaker configuration parameter. In an embodiment, the source device 110 generates the candidate virtual speaker set in real time based on a capability of a computing resource (for example, a processor) of the source device 110 and a feature (for example, a channel and a data amount) of the current frame.

For a specific method for generating the candidate virtual speaker set, refer to the conventional technology and the descriptions of the virtual speaker configuration unit 310 and the virtual speaker set generation unit 320 in the foregoing embodiment.

S430: The source device 110 selects a representative virtual speaker for the current frame from the candidate virtual speaker set based on the current frame of the three-dimensional audio signal.

The source device 110 votes for the virtual speaker based on a coefficient of the current frame and a coefficient of the virtual speaker, and selects the representative virtual speaker for the current frame from the candidate virtual speaker set based on a vote value of the virtual speaker. The candidate virtual speaker set is searched for a limited quantity of representative virtual speakers for the current frame, and the limited quantity of representative virtual speakers are used as virtual speakers that best match the to-be-encoded current frame, thereby perform data compression on the to-be-encoded three-dimensional audio signal.

Figure 5:
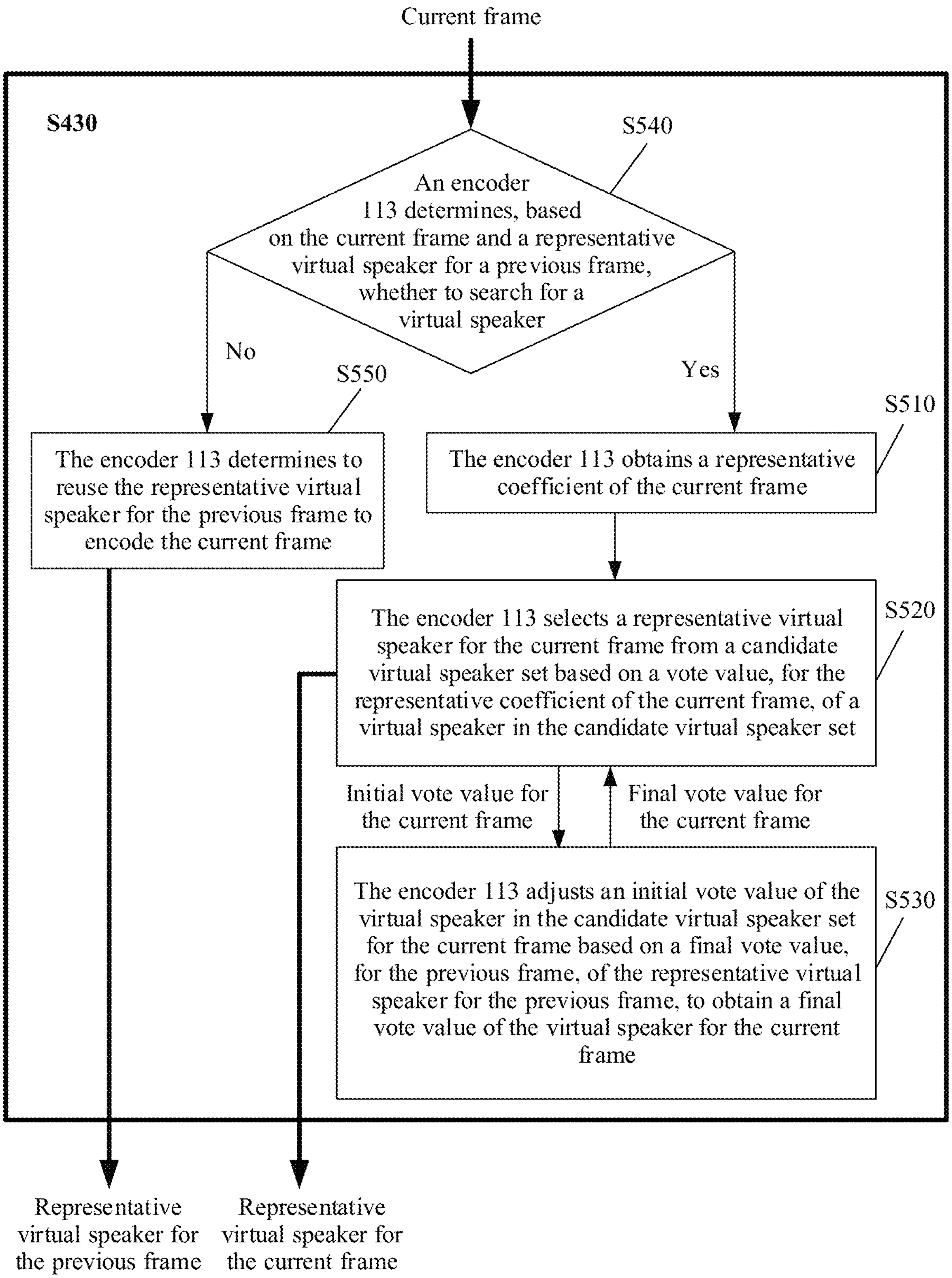
FIG. 5 is a schematic flowchart of a method for selecting a virtual speaker according to an embodiment of this application.

FIG. 5 is a schematic flowchart of a method for selecting a virtual speaker according to an embodiment of this application. The method procedure in FIG. 5 describes a specific process included in S430 in FIG. 4. Herein, a description is provided by using an example in which the encoder 113 in the source device 110 shown in FIG. 1 performs a virtual speaker selection process. Specifically, a function of the virtual speaker selection unit 340 is implemented. As shown in FIG. 5, the method includes the following operations.

S510: The encoder 113 obtains a representative coefficient of a current frame.

The representative coefficient may be a frequency-domain representative coefficient or a time-domain representative coefficient. The frequency-domain representative coefficient may also be referred to as a frequency-domain representative frequency or a spectrum representative coefficient. The time-domain representative coefficient may also be referred to as a time-domain representative sampling point. For a specific method for obtaining the representative coefficient of the current frame, refer to the description of S6101 in FIG. 7A.

S520: The encoder 113 selects a representative virtual speaker for the current frame from a candidate virtual speaker set based on a vote value, for the representative coefficient of the current frame, of a virtual speaker in the candidate virtual speaker set, that is, performs operations S440 to S460.

The encoder 113 votes for a virtual speaker in the candidate virtual speaker set based on the representative coefficient of the current frame and a coefficient of the virtual speaker, and selects (searches for) a representative virtual speaker for the current frame from the candidate virtual speaker set based on a final vote value of the virtual speaker for the current frame. For a specific method for selecting the representative virtual speaker for the current frame, refer to descriptions of S610 and S620 in FIG. 6 and FIG. 7A and FIG. 7B.

It should be noted that the encoder first traverses virtual speakers included in the candidate virtual speaker set, and compresses the current frame by using the representative virtual speaker for the current frame selected from the candidate virtual speaker set. However, if results of selecting virtual speakers for consecutive frames vary greatly, a sound image of a reconstructed three-dimensional audio signal is unstable, and sound quality of the reconstructed three-dimensional audio signal is degraded. In this embodiment of this application, the encoder 113 may update, based on a final vote value that is for a previous frame and that is of a representative virtual speaker for the previous frame, an initial vote value that is for the current frame and that is of the virtual speaker included in the candidate virtual speaker set, to obtain a final vote value of the virtual speaker for the current frame; and then select the representative virtual speaker for the current frame from the candidate virtual speaker set based on the final vote value of the virtual speaker for the current frame. In this way, the representative virtual speaker for the current frame is selected based on the representative virtual speaker for the previous frame. Therefore, when selecting, for the current frame, a representative virtual speaker for the current frame, the encoder more tends to select a virtual speaker that is the same as the representative virtual speaker for the previous frame. This increases orientation continuity between consecutive frames, and overcoming a problem that results of selecting virtual speakers for consecutive frames vary greatly. Therefore, this embodiment of this application may further include S530.

S530: The encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame.

After the encoder 113 votes for the virtual speaker in the candidate virtual speaker set based on the representative coefficient of the current frame and a coefficient of the virtual speaker, to obtain the initial vote value of the virtual speaker for the current frame, the encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame. The representative virtual speaker for the previous frame is a virtual speaker used when the encoder 113 encodes the previous frame. For a specific method for adjusting the initial vote value of the virtual speaker in the candidate virtual speaker set for the current frame, refer to descriptions of S6201 and S6202 in FIG. 8.

In some embodiments, if the current frame is a first frame in original audio, the encoder 113 performs S510 and S520. If the current frame is any frame after a second frame in the original audio, the encoder 113 may first determine whether to reuse the representative virtual speaker for the previous frame to encode the current frame; or determine whether to search for a virtual speaker, so as to ensure orientation continuity between consecutive frames and reduce coding complexity. This embodiment of this application may further include S540.

S540: The encoder 113 determines, based on the current frame and the representative virtual speaker for the previous frame, whether to search for a virtual speaker.

If determining to search for a virtual speaker, the encoder 113 performs S510 to S530. Optionally, the encoder 113 may first perform S510: The encoder 113 obtains the representative coefficient of the current frame. The encoder 113 determines, based on the representative coefficient of the current frame and a coefficient of the representative virtual speaker for the previous frame, whether to search for a virtual speaker. If determining to search for a virtual speaker, the encoder 113 performs S520 to S530.

If determining not to search for a virtual speaker, the encoder 113 performs S550.

S550: The encoder 113 determines to reuse the representative virtual speaker for the previous frame to encode the current frame.

The encoder 113 reuses the representative virtual speaker for the previous frame and the current frame to generate a virtual speaker signal, encodes the virtual speaker signal to obtain a bitstream, and sends the bitstream to the destination device 120, that is, performs S450 and S460.

Figure 9:
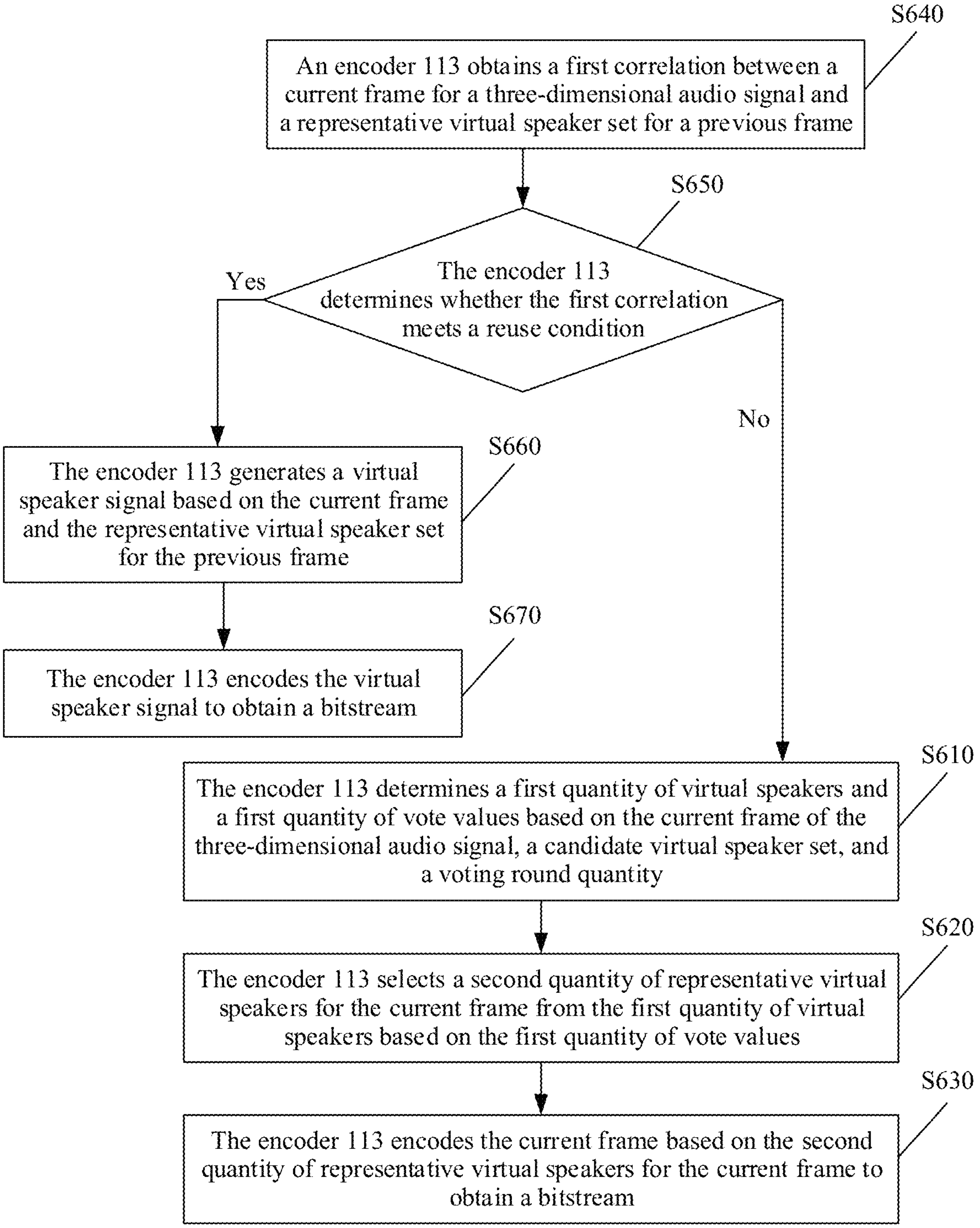
FIG. 9 is a schematic flowchart of another method for selecting a virtual speaker according to an embodiment of this application.

For a specific method for determining whether to search for a virtual speaker, refer to descriptions of S640 to S670 in FIG. 9.

S440: The source device 110 generates a virtual speaker signal based on the current frame of the three-dimensional audio signal and the representative virtual speaker for the current frame.

The source device 110 generates the virtual speaker signal based on the coefficient of the current frame and a coefficient of the representative virtual speaker for the current frame. For a specific method for generating the virtual speaker signal, refer to the conventional technology and the description of the virtual speaker signal generation unit 350 in the foregoing embodiment.

S450: The source device 110 encodes the virtual speaker signal to obtain a bitstream.

The source device 110 may perform an encoding operation such as transformation or quantization on the virtual speaker signal to generate the bitstream, to perform data compression on the to-be-encoded three-dimensional audio signal. For a specific method for generating the bitstream, refer to the conventional technology and the description of the encoding unit 360 in the foregoing embodiment.

S460: The source device 110 sends the bitstream to the destination device 120.

The source device 110 may send a bitstream of the original audio to the destination device 120 after encoding all the original audio. Alternatively, the source device 110 may encode the three-dimensional audio signal in real time in unit of frames, and send a bitstream of a frame after encoding the frame. For a specific method for sending the bitstream, refer to the conventional technology and the descriptions of the communication interface 114 and the communication interface 124 in the foregoing embodiment.

S470: The destination device 120 decodes the bitstream sent by the source device 110, and reconstructs the three-dimensional audio signal to obtain a reconstructed three-dimensional audio signal.

After receiving the bitstream, the destination device 120 decodes the bitstream to obtain the virtual speaker signal, and then reconstructs the three-dimensional audio signal based on the candidate virtual speaker set and the virtual speaker signal to obtain the reconstructed three-dimensional audio signal. The destination device 120 plays back the reconstructed three-dimensional audio signal. Alternatively, the destination device 120 transmits the reconstructed three-dimensional audio signal to another playing device, and the another playing device plays the reconstructed three-dimensional audio signal, to achieve a more vivid "immersive" sound effect in which a listener feels like being in a cinema, a concert hall, a virtual scene, or the like.

Currently, in a process of searching for a virtual speaker, the encoder uses a result of related calculation between a to-be-encoded three-dimensional audio signal and a virtual speaker as a selection measurement indicator of the virtual speaker. If the encoder transmits a virtual speaker for each coefficient, data compression cannot be achieved, and heavy calculation load is caused to the encoder. An embodiment of this application provides a method for selecting a virtual speaker. An encoder uses a representative coefficient of a current frame to vote for each virtual speaker in a candidate virtual speaker set, and selects a representative virtual speaker for the current frame based on a vote value, thereby reducing calculation complexity of searching for a virtual speaker and reducing calculation load of the encoder.

Figure 6:
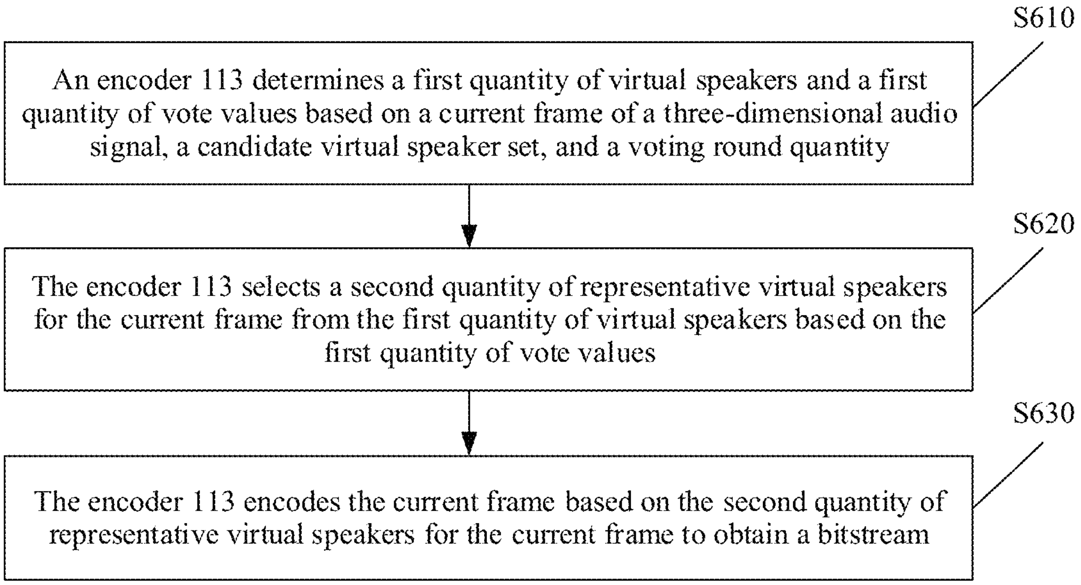
FIG. 6 is a schematic flowchart of a three-dimensional audio signal encoding method according to an embodiment of this application.

With reference to the accompanying drawings, the following describes in detail a process of selecting a virtual speaker. FIG. 6 is a schematic flowchart of a three-dimensional audio signal encoding method according to an embodiment of this application. Herein, a description is provided by using an example in which the encoder 113 in the source device 110 in FIG. 1 performs a virtual speaker selection process. The method procedure in FIG. 6 describes a specific process included in S520 in FIG. 5. As shown in FIG. 6, the method includes the following operations.

S610: The encoder 113 determines a first quantity of virtual speakers and a first quantity of vote values based on a current frame of a three-dimensional audio signal, a candidate virtual speaker set, and a voting round quantity.

The voting round quantity is used to limit a quantity of times of voting for a virtual speaker. The voting round quantity is an integer greater than or equal to 1, the voting round quantity is less than or equal to a quantity of virtual speakers included in the candidate virtual speaker set, and the voting round quantity is less than or equal to a quantity of virtual speaker signals transmitted by the encoder. For example, the candidate virtual speaker set includes a fifth quantity of virtual speakers, the fifth quantity of virtual speakers include the first quantity of virtual speakers, the first quantity is less than or equal to the fifth quantity, the voting round quantity is an integer greater than or equal to 1, and the voting round quantity is less than or equal to the fifth quantity. The virtual speaker signal also refers to a transmission channel of a representative virtual speaker for the current frame that corresponds to the current frame. Generally, a quantity of virtual speaker signals is less than or equal to a quantity of virtual speakers.

In a possible embodiment, the voting round quantity may be preconfigured, or may be determined based on a computing capability of the encoder. For example, the voting round quantity is determined based on a coding rate at which the encoder encodes the current frame and/or a coding application scenario.

For example, if the coding rate of the encoder is low (for example, a 3-order HOA signal is encoded and transmitted at a rate less than or equal to 128 kbps), the voting round quantity is 1; if the coding rate of the encoder is medium (for example, a 3-order HOA signal is encoded and transmitted at a rate ranging from 192 kbps to 512 kbps), the voting round quantity is 4; or if the coding rate of the encoder is high (for example, a 3-order HOA signal is encoded and transmitted at a rate greater than or equal to 768 kbps), the voting round quantity is 7.

For another example, if the encoder is used for real-time communication, coding complexity is required to be low, and the voting round quantity is 1; if the encoder is used to broadcast streaming media, coding complexity is required to be medium, and the voting round quantity is 2; or if the encoder is used for high-quality data storage, coding complexity is required to be high, and the voting round quantity is 6.

For another example, if the coding rate of the encoder is 128 kbps and a coding complexity requirement is low, the voting round quantity is 1.

In another possible embodiment, the voting round quantity is determined based on a quantity of directional sound sources in the current frame. For example, when a quantity of directional sound sources in a sound field is 2, the voting round quantity is set to 2.

This embodiment of this application provides three possible embodiments of determining the first quantity of virtual speakers and the first quantity of vote values. The following separately describes the three manners in detail.

In a first possible embodiment, the voting round quantity is equal to 1, and after sampling a plurality of representative coefficients, the encoder 113 obtains vote values of all virtual speakers in the candidate virtual speaker set for each representative coefficient of the current frame, and accumulates vote values of virtual speakers with a same number, to obtain the first quantity of virtual speakers and the first quantity of vote values. For example, refer to the following descriptions of S6101 to S6105 in FIG. 7A.

It may be understood that the candidate virtual speaker set includes the first quantity of virtual speakers. The first quantity of virtual speakers is equal to the quantity of virtual speakers included in the candidate virtual speaker set. Assuming that the candidate virtual speaker set includes the fifth quantity of virtual speakers, the first quantity is equal to the fifth quantity. The first quantity of vote values include vote values of all the virtual speakers in the candidate virtual speaker set. The encoder 113 may use the first quantity of vote values as final vote values that are of the first quantity of virtual speakers and that correspond to the current frame, to perform S620, to be specific, the encoder 113 selects a second quantity of representative virtual speakers for the current frame from the first quantity of virtual speakers based on the first quantity of vote values.

The virtual speakers are in a one-to-one correspondence with the vote values, that is, one virtual speaker corresponds to one vote value. For example, the first quantity of virtual speakers include a first virtual speaker, the first quantity of vote values include a vote value of the first virtual speaker, and the first virtual speaker corresponds to the vote value of the first virtual speaker. The vote value of the first virtual speaker represents a priority of using the first virtual speaker when the current frame is encoded. The priority may also be replaced with a tendency, to be specific, the vote value of the first virtual speaker represents a tendency of using the first virtual speaker when the current frame is encoded. It may be understood that a larger vote value of the first virtual speaker indicates a higher priority or a higher tendency of the first virtual speaker, and compared with a virtual speaker that is in the candidate virtual speaker set and whose vote value is less than the vote value of the first virtual speaker, the encoder 113 tends to select the first virtual speaker to encode the current frame.

In a second possible embodiment, a difference from the first possible embodiment lies in the following: After obtaining the vote values of all the virtual speakers in the candidate virtual speaker set for each representative coefficient of the current frame, the encoder 113 selects some vote values from the vote values of all the virtual speakers in the candidate virtual speaker set for each representative coefficient, and accumulates vote values of virtual speakers with a same number in virtual speakers corresponding to the some vote values, to obtain the first quantity of virtual speakers and the first quantity of vote values. It may be understood that the first quantity is less than or equal to the quantity of virtual speakers included in the candidate virtual speaker set. The first quantity of vote values include vote values of some virtual speakers included in the candidate virtual speaker set, or the first quantity of vote values include vote values of all the virtual speakers included in the candidate virtual speaker set. For example, refer to descriptions of S6101 to S6104 and S6106 to S6110 in FIG. 7A and FIG. 7B.

In a third possible embodiment, a difference from the second possible embodiment lies in the following: The voting round quantity is an integer greater than or equal to 2, and for each representative coefficient of the current frame, the encoder 113 performs at least two rounds of voting on all the virtual speakers in the candidate virtual speaker set, and selects a virtual speaker with a largest vote value in each round. After at least two rounds of voting are performed on all the virtual speakers for each representative coefficient of the current frame, vote values of virtual speakers with a same number are accumulated, to obtain the first quantity of virtual speakers and the first quantity of vote values.

It is assumed that the voting round quantity is 2, the fifth quantity of virtual speakers include a first virtual speaker, a second virtual speaker, and a third virtual speaker, and the representative coefficient of the current frame includes a first representative coefficient and a second representative coefficient.

The encoder 113 first performs two rounds of voting on the three virtual speakers based on the first representative coefficient. In a first voting round, the encoder 113 votes for the three virtual speakers based on the first representative coefficient. Assuming that a largest vote value is a vote value of the first virtual speaker, the first virtual speaker is selected. In a second voting round, the encoder 113 separately votes for the second virtual speaker and the third virtual speaker based on the first representative coefficient. Assuming that a largest vote value is a vote value of the second virtual speaker, the second virtual speaker is selected.

Further, the encoder 113 performs two rounds of voting on the three virtual speakers based on the second representative coefficient. In a first voting round, the encoder 113 votes for the three virtual speakers based on the second representative coefficient. Assuming that a largest vote value is a vote value of the second virtual speaker, the second virtual speaker is selected. In a second voting round, the encoder 113 separately votes for the first virtual speaker and the third virtual speaker based on the second representative coefficient. Assuming that a largest vote value is a vote value of the third virtual speaker, the third virtual speaker is selected.

Finally, the first quantity of virtual speakers include the first virtual speaker, the second virtual speaker, and the third virtual speaker. The vote value of the first virtual speaker is equal to a vote value of the first virtual speaker for the first representative coefficient in the first voting round. The vote value of the second virtual speaker is equal to a sum of a vote value of the second virtual speaker for the first representative coefficient in the second voting round and a vote value of the second virtual speaker for the second representative coefficient in the first voting round. The vote value of the third virtual speaker is equal to a vote value of the third virtual speaker for the second representative coefficient in the second voting round.

S620: The encoder 113 selects a second quantity of representative virtual speakers for the current frame from the first quantity of virtual speakers based on the first quantity of vote values.

The encoder 113 selects the second quantity of representative virtual speakers for the current frame from the first quantity of virtual speakers based on the first quantity of vote values. In addition, vote values of the second quantity of representative virtual speakers for the current frame are greater than a preset threshold.

The encoder 113 may alternatively select a second quantity of vote values from the first quantity of vote values based on the first quantity of vote values. For example, a second quantity of vote values are determined from the first quantity of vote values in descending order of the first quantity of vote values, and virtual speakers that are in the first quantity of virtual speakers and that correspond to the second quantity of vote values are used as the second quantity of representative virtual speakers for the current frame.

In an embodiment, if vote values of virtual speakers with different numbers in the first quantity of virtual speakers are the same, and the vote values of the virtual speakers with different numbers are greater than the preset threshold, the encoder 113 may use all the virtual speakers with different numbers as representative virtual speakers for the current frame.

It should be noted that the second quantity is less than the first quantity. The first quantity of virtual speakers include the second quantity of representative virtual speakers for the current frame. The second quantity may be preset, or the second quantity may be determined based on a quantity of sound sources in a sound field of the current frame. For example, the second quantity may be directly equal to the quantity of sound sources in the sound field of the current frame, or the quantity of sound sources in the sound field of the current frame is processed based on a preset algorithm, and a quantity obtained through processing is used as the second quantity. The preset algorithm may be designed based on a requirement. For example, the preset algorithm may be: the second quantity=the quantity of sound sources in the sound field of the current frame+1, or the second quantity=the quantity of sound sources in the sound field of the current frame−1.

S630: The encoder 113 encodes the current frame based on the second quantity of representative virtual speakers for the current frame to obtain a bitstream.

The encoder 113 generates a virtual speaker signal based on the second quantity of representative virtual speakers for the current frame and the current frame, and encodes the virtual speaker signal to obtain the bitstream.

The encoder selects some coefficients from all coefficients of the current frame as representative coefficients, and uses a small quantity of representative coefficients to replace all the coefficients of the current frame to select a representative virtual speaker from the candidate virtual speaker set. Therefore, calculation complexity of searching for a virtual speaker by the encoder is effectively reduced, thereby reducing calculation complexity of performing compression coding the three-dimensional audio signal and reducing calculation load of the encoder. For example, a frame of an N-order HOA signal has $960\cdot(N+1)^2$ coefficients. In this embodiment, the first 10% coefficients may be selected to participate in searching for a virtual speaker. In this case, coding complexity is reduced by 90% compared with coding complexity generated when all the coefficient participates in searching for a virtual speaker.

Figures 7A, 7B:
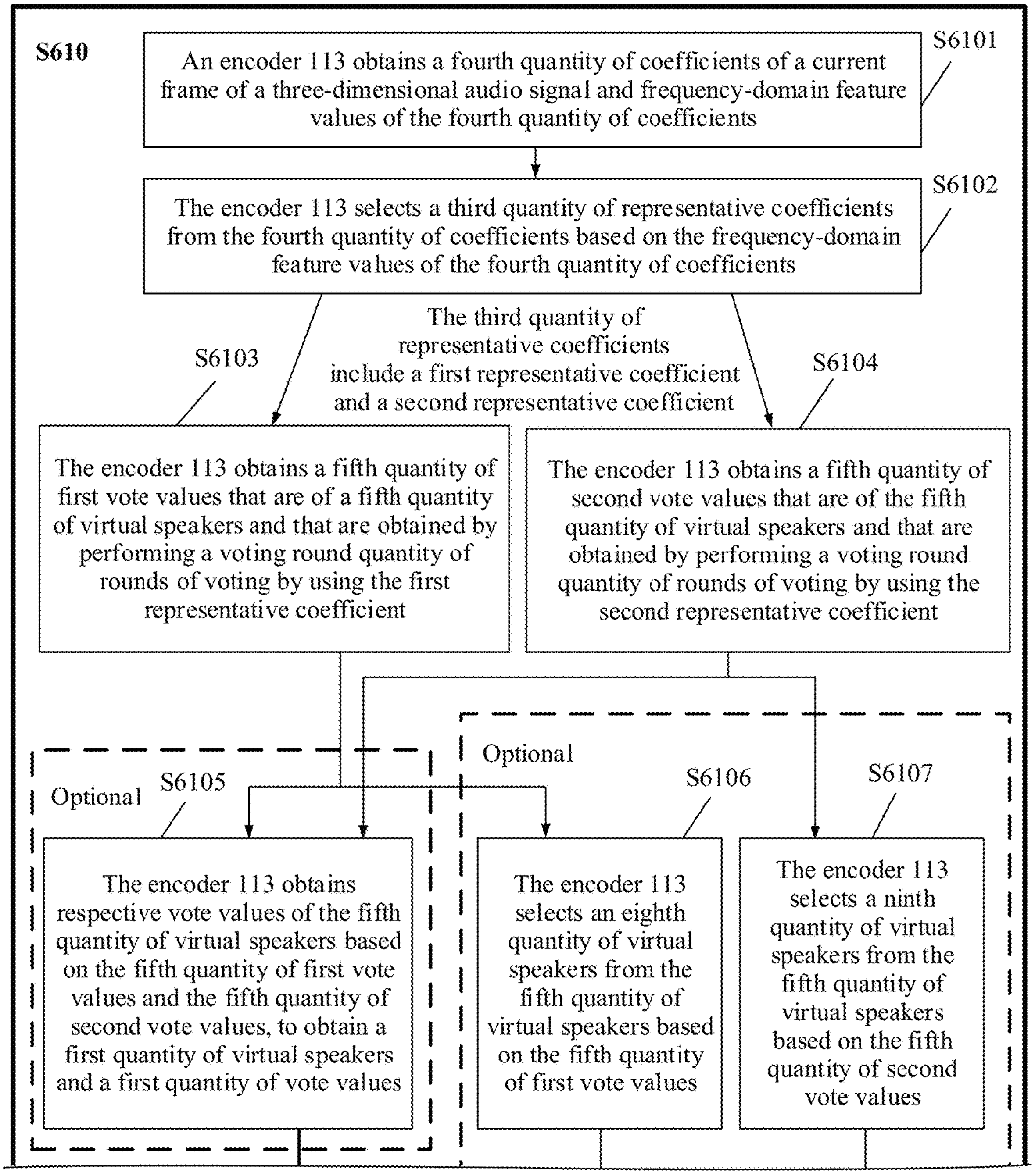
FIG. 7A and FIG. 7B are a schematic flowchart of another method for selecting a virtual speaker according to an embodiment of this application.
Figure 7B:
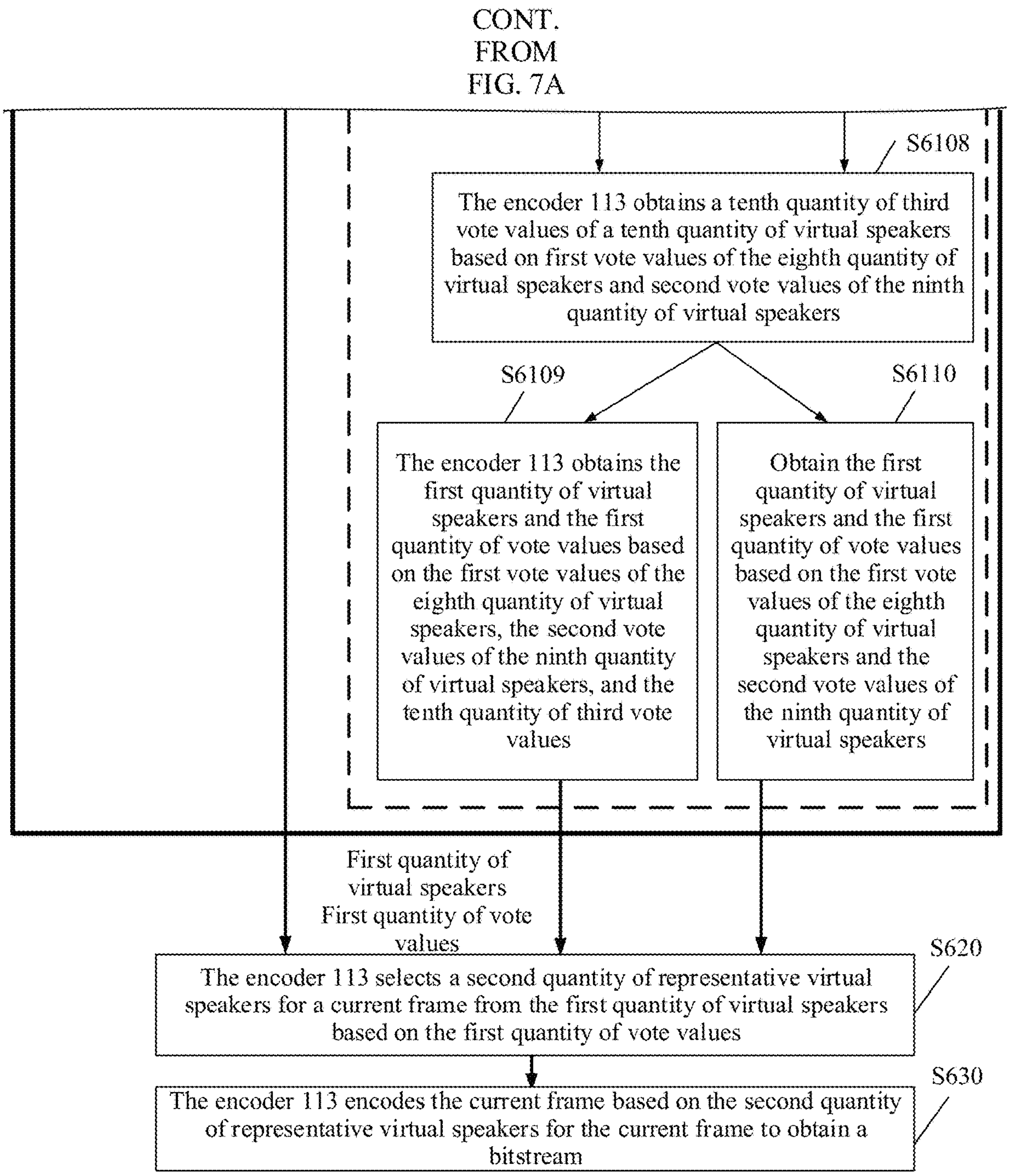

FIG. 7A and FIG. 7B are a schematic flowchart of another method for selecting a virtual speaker according to an embodiment of this application. The method procedure in FIG. 7A and FIG. 7B describes a specific process included in S610 in FIG. 6. It is assumed that the candidate virtual speaker set includes a fifth quantity of virtual speakers, and the fifth quantity of virtual speakers include a first virtual speaker.

S6101: The encoder 113 obtains a fourth quantity of coefficients of a current frame and frequency-domain feature values of the fourth quantity of coefficients.

It is assumed that the three-dimensional audio signal is an HOA signal, and the encoder 113 may sample a current frame of the HOA signal to obtain $L\cdot(N+1)^2$ sampling points, that is, obtain a fourth quantity of coefficients. N is an order of the HOA signal. For example, it is assumed that duration of a current frame of the HOA signal is 20 milliseconds, and the encoder 113 samples the current frame at a frequency of 48 kHz, to obtain $960\cdot(N+1)^2$ sampling points in time domain. The sampling point may also be referred to as a time-domain coefficient.

The frequency-domain coefficient of the current frame of the three-dimensional audio signal may be obtained by performing time-frequency conversion based on the time-domain coefficient of the current frame of the three-dimensional audio signal. A method for conversion from time domain to frequency domain is not limited. For example, the method for conversion from the time domain to the frequency domain is modified discrete cosine transform (MDCT), and $960\cdot(N+1)^2$ frequency-domain coefficients in frequency domain may be obtained. The frequency-domain coefficient may also be referred to as a spectrum coefficient or a frequency.

A frequency-domain feature value of the sampling point satisfies $p(j)=\text{norm}(x(j))$, where $j=1, 2, \ldots,$ and L, L represents a quantity of sampling moments, x represents the frequency-domain coefficient, for example, an MDCT coefficient, of the current frame of the three-dimensional audio signal, "norm" is an operation of solving a 2-norm, and x(j) represents frequency-domain coefficients of $(N+1)^2$ sampling points at a $j^{th}$ sampling moment.

S6102: The encoder 113 selects a third quantity of representative coefficients from the fourth quantity of coefficients based on the frequency-domain feature values of the fourth quantity of coefficients.

The encoder 113 divides a spectral range indicated by the fourth quantity of coefficients into at least one subband. The encoder 113 divides the spectral range indicated by the fourth quantity of coefficients into one subband. It may be understood that a spectral range of the subband is equal to the spectral range indicated by the fourth quantity of coefficients, which is equivalent to that the encoder 113 does not divide the spectral range indicated by the fourth quantity of coefficients.

If the encoder 113 divides the spectral range indicated by the fourth quantity of coefficients into at least two sub-frequency bands, in one case, the encoder 113 equally divides the spectral range indicated by the fourth quantity of coefficients into at least two subbands, where all subbands in the at least two subbands include a same quantity of coefficients.

In another case, the encoder 113 unequally divides the spectral range indicated by the fourth quantity of coefficients, and at least two subbands obtained through division include different quantities of coefficients, or all subbands in the at least two subbands obtained through division include different quantities of coefficients. For example, the encoder 113 may unequally divide, based on a low frequency range, an intermediate frequency range, and a high frequency range in the spectral range indicated by the fourth quantity of coefficients, the spectral range indicated by the fourth quantity of coefficients, so that each spectral range in the low frequency range, the intermediate frequency range, and the high frequency range includes at least one subband. All subbands in the at least one subband in the low frequency range include a same quantity of coefficients, all subbands in the at least one subband in the intermediate frequency range include a same quantity of coefficients, and all subbands in the at least one subband in the high frequency range include a same quantity of coefficients. Subbands in the three spectral ranges, that is, the low frequency range, the intermediate frequency range, and the high frequency range, may include different quantities of coefficients.

Further, the encoder 113 selects, based on the frequency-domain feature values of the fourth quantity of coefficients, a representative coefficient from at least one subband included in the spectral range indicated by the fourth quantity of coefficients, to obtain the third quantity of representative coefficients. The third quantity is less than the fourth quantity, and the fourth quantity of coefficients include the third quantity of representative coefficients.

For example, the encoder 113 respectively selects, in descending order of frequency-domain feature values of coefficients in subbands in the at least one subband included in the spectral range indicated by the fourth quantity of coefficients, Z representative coefficients from the subbands, and combines the Z representative coefficients in the at least one subband to obtain the third quantity of representative coefficients, where Z is a positive integer.

For another example, when the at least one subband includes at least two subbands, the encoder 113 determines a weight of each of the at least two subbands based on a frequency-domain feature value of a first candidate coefficient in the subband, and adjusts a frequency-domain feature value of a second candidate coefficient in each subband based on the weight of the subband to obtain an adjusted frequency-domain feature value of the second candidate coefficient in each subband, where the first candidate coefficient and the second candidate coefficient are partial coefficients in the subband. The encoder 113 determines the third quantity of representative coefficients based on adjusted frequency-domain feature values of second candidate coefficients in the at least two subbands and frequency-domain feature values of coefficients other than the second candidate coefficients in the at least two subbands.

The encoder selects some coefficients from all coefficients of the current frame as representative coefficients, and uses a small quantity of representative coefficients to replace all the coefficients of the current frame to select a representative virtual speaker from the candidate virtual speaker set. Therefore, calculation complexity of searching for a virtual speaker by the encoder is effectively reduced, thereby reducing calculation complexity of performing compression coding the three-dimensional audio signal and reducing calculation load of the encoder.

Assuming that the third quantity of representative coefficients include a first representative coefficient and a second representative coefficient, S6103 to S6110 are performed.

S6103: The encoder 113 obtains a fifth quantity of first vote values that are of the fifth quantity of virtual speakers and that are obtained by performing the voting round quantity of rounds of voting by using the first representative coefficient.

The encoder 113 uses the first representative coefficient to represent the current frame, to vote for that the current frame is encoded by using the fifth quantity of virtual speakers, and determines the fifth quantity of first vote values based on coefficients of the fifth quantity of virtual speakers and the first representative coefficient. The fifth quantity of first vote values include a first vote value of the first virtual speaker.

S6104: The encoder 113 obtains a fifth quantity of second vote values that are of the fifth quantity of virtual speakers and that are obtained by performing the voting round quantity of rounds of voting by using the second representative coefficient.

The encoder 113 uses the second representative coefficient to represent the current frame, to vote for that the current frame is encoded by using the fifth quantity of virtual speakers, and determines the fifth quantity of second vote values based on the coefficients of the fifth quantity of virtual speakers and the second representative coefficient. The fifth quantity of second vote values include a second vote value of the first virtual speaker.

S6105: The encoder 113 obtains respective vote values of the fifth quantity of virtual speakers based on the fifth quantity of first vote values and the fifth quantity of second vote values, to obtain the first quantity of virtual speakers and the first quantity of vote values.

For virtual speakers with a same number in the fifth quantity of virtual speakers, the encoder 113 accumulates first vote values and second vote values of the virtual speakers. The vote value of the first virtual speaker is equal to a sum of the first vote value of the first virtual speaker and the second vote value of the first virtual speaker. For example, the first vote value of the first virtual speaker is 10, the second vote value of the first virtual speaker is 15, and the vote value of the first virtual speaker is 25.

It may be understood that the fifth quantity is equal to the first quantity, and the first quantity of virtual speakers obtained after the encoder 113 performs voting are the fifth quantity of virtual speakers. The first quantity of vote values are vote values of the fifth quantity of virtual speakers.

Therefore, the encoder votes, for each coefficient of the current frame, for the fifth quantity of virtual speakers included in the candidate virtual speaker set, and uses the vote values of the fifth quantity of virtual speakers included in the candidate virtual speaker set as a selection basis, to cover the fifth quantity of virtual speakers in an all-round manner, thereby ensuring accuracy of a representative virtual speaker that is for the current frame and that is selected by the encoder.

In some other embodiments, the encoder may determine the first quantity of virtual speakers and the first quantity of vote values based on vote values of some virtual speakers in the candidate virtual speaker set. After S6103 and S6104, this embodiment of this application may further include operations S6106 to S6110.

S6106: The encoder 113 selects an eighth quantity of virtual speakers from the fifth quantity of virtual speakers based on the fifth quantity of first vote values.

The encoder 113 sorts the fifth quantity of first vote values, and selects, in descending order of the fifth quantity of first vote values, the eighth quantity of virtual speakers from the fifth quantity of virtual speakers starting from a largest first vote value. The eighth quantity is less than the fifth quantity. The fifth quantity of first vote values include an eighth quantity of first vote values. The eighth quantity is an integer greater than or equal to 1.

S6107: The encoder 113 selects a ninth quantity of virtual speakers from the fifth quantity of virtual speakers based on the fifth quantity of second vote values.

The encoder 113 sorts the fifth quantity of second vote values, and selects, in descending order of the fifth quantity of second vote values, the ninth quantity of virtual speakers from the fifth quantity of virtual speakers starting from a largest second vote value. The ninth quantity is less than the fifth quantity. The fifth quantity of second vote values include a ninth quantity of second vote values. The ninth quantity is an integer greater than or equal to 1.

S6108: The encoder 113 obtains a tenth quantity of third vote values of a tenth quantity of virtual speakers based on first vote values of the eighth quantity of virtual speakers and second vote values of the ninth quantity of virtual speakers.

If virtual speakers with a same number exist in the eighth quantity of virtual speakers and the ninth quantity of virtual speakers, the encoder 113 accumulates first vote values and second vote values of the same virtual speaker to obtain the tenth quantity of third vote values of the tenth quantity of virtual speakers. For example, it is assumed that the eighth quantity of virtual speakers include a second virtual speaker and the ninth quantity of virtual speakers include the second virtual speaker. A third vote value of the second virtual speaker is equal to a sum of a first vote value of the second virtual speaker and a second vote value of the second virtual speaker.

It may be understood that the tenth quantity is less than or equal to the eighth quantity, which indicates that the eighth quantity of virtual speakers include the tenth quantity of virtual speakers; and the tenth quantity is less than or equal to the ninth quantity, which indicates that the ninth quantity of virtual speakers include the tenth quantity of virtual speakers. In addition, the tenth quantity is an integer greater than or equal to 1.

S6109: The encoder 113 obtains the first quantity of virtual speakers and the first quantity of vote values based on the first vote values of the eighth quantity of virtual speakers, the second vote values of the ninth quantity of virtual speakers, and the tenth quantity of third vote values.

The first quantity of virtual speakers include the eighth quantity of virtual speakers and the ninth quantity of virtual speakers. The fifth quantity of virtual speakers include the first quantity of virtual speakers. The first quantity is less than or equal to the fifth quantity.

For example, assuming that the fifth quantity of virtual speakers include a first virtual speaker, a second virtual speaker, a third virtual speaker, a fourth virtual speaker, and a fifth virtual speaker, the eighth quantity of virtual speakers include the first virtual speaker and the second virtual speaker, the ninth quantity of virtual speakers include the first virtual speaker and the third virtual speaker, and the first quantity of virtual speakers include the first virtual speaker, the second virtual speaker, and the third virtual speaker, the first quantity is less than the fifth quantity.

For another example, assuming that the fifth quantity of virtual speakers include a first virtual speaker, a second virtual speaker, a third virtual speaker, a fourth virtual speaker, and a fifth virtual speaker, the eighth quantity of virtual speakers include the first virtual speaker, the second virtual speaker, and the third virtual speaker, the ninth quantity of virtual speakers include the first virtual speaker, the fourth virtual speaker, and the fifth virtual speaker, and the first quantity of virtual speakers include the first virtual speaker, the second virtual speaker, the third virtual speaker, the fourth virtual speaker, and the fifth virtual speaker, the first quantity is equal to the fifth quantity.

In some embodiments, if virtual speakers with a same number exist in the eighth quantity of virtual speakers and the ninth quantity of virtual speakers, the first quantity of virtual speakers include the tenth quantity of virtual speakers.

In one case, numbers of the eighth quantity of virtual speakers are completely the same as numbers of the ninth quantity of virtual speakers. The eighth quantity is equal to the ninth quantity, the tenth quantity is equal to the eighth quantity, and the tenth quantity is equal to the ninth quantity. Therefore, numbers of the first quantity of virtual speakers are equal to numbers of the tenth quantity of virtual speakers, and the first quantity of vote values are equal to the tenth quantity of third vote values.

In another case, the eighth quantity of virtual speakers are not completely the same as the ninth quantity of virtual speakers. For example, the eighth quantity of virtual speakers include the ninth quantity of virtual speakers, and the eighth quantity of virtual speakers further include a virtual speaker whose number is different from numbers of the ninth quantity of virtual speakers. The eighth quantity is greater than the ninth quantity, the tenth quantity is less than the eighth quantity, and the tenth quantity is equal to the ninth quantity. The first quantity of vote values include the tenth quantity of third vote values and a first vote value of the virtual speaker whose number is different from the numbers of the ninth quantity of virtual speakers.

For another example, the ninth quantity of virtual speakers include the eighth quantity of virtual speakers, and the ninth quantity of virtual speakers further include a virtual speaker whose number is different from numbers of the eighth quantity of virtual speakers. The eighth quantity is less than the ninth quantity, the tenth quantity is equal to the eighth quantity, and the tenth quantity is less than the ninth quantity. The first quantity of vote values include the tenth quantity of third vote values and a second vote value of the virtual speaker whose number is different from the numbers of the eighth quantity of virtual speakers.

For another example, the eighth quantity of virtual speakers include the tenth quantity of virtual speakers, and the eighth quantity of virtual speakers further include a virtual speaker whose number is different from numbers of the ninth quantity of virtual speakers; and the ninth quantity of virtual speakers include the tenth quantity of virtual speakers, and the ninth quantity of virtual speakers further include a virtual speaker whose number is different from numbers of the eighth quantity of virtual speakers. The tenth quantity is less than the eighth quantity, and the tenth quantity is less than the ninth quantity. The first quantity of vote values include the tenth quantity of third vote values, a first vote value of the virtual speaker whose number is different from the numbers of the ninth quantity of virtual speakers, and a second vote value of the virtual speaker whose number is different from the numbers of the eighth quantity of virtual speakers.

In some other embodiments, if no virtual speakers with a same number exist in the eighth quantity of virtual speakers and the ninth quantity of virtual speakers, the tenth quantity is equal to 0, and the first quantity of virtual speakers do not include the tenth quantity of virtual speakers. After performing S6106 and S6107, the encoder 113 may directly perform S6110.

S6110: The encoder 113 obtains the first quantity of virtual speakers and the first quantity of vote values based on the first vote values of the eighth quantity of virtual speakers and the second vote values of the ninth quantity of virtual speakers.

The eighth quantity of virtual speakers are completely different from the ninth quantity of virtual speakers. For example, the eighth quantity of virtual speakers do not include the ninth quantity of virtual speakers, and the ninth quantity of virtual speakers do not include the eighth quantity of virtual speakers. Thus, there is no overlap between the eighth quantity of virtual speakers and the ninth quantity of virtual speakers. The first quantity of virtual speakers include the eighth quantity of virtual speakers and the ninth quantity of virtual speakers, and the first quantity of vote values include the first vote values of the eighth quantity of virtual speakers and the second vote values of the ninth quantity of virtual speakers.

In this way, the encoder selects a vote value with a large value from vote values, for each coefficient of the current frame, of the fifth quantity of virtual speakers included in the candidate virtual speaker set, and determines the first quantity of virtual speakers and the first quantity of vote values by using the vote value with a large value, thereby reducing calculation complexity of searching for a virtual speaker by the encoder while ensuring accuracy of a representative virtual speaker that is for the current frame and that is selected by the encoder.

The following describes, with reference to a formula, a method for calculating a vote value. First, the encoder 113 performs operation 1 to determine, based on a correlation value between a $j^{th}$ representative coefficient of the HOA signal and a coefficient of an $l^{th}$ virtual speaker, a vote value $P_{jil}$ of the $l^{th}$ virtual speaker for the $j^{th}$ representative coefficient in an $i^{th}$ round. The $j^{th}$ representative coefficient may be any coefficient in the third quantity of representative coefficients, where l=1, 2, . . . , and Q, which indicates that a value range of l is from 1 to Q, and Q represents a quantity of virtual speakers in the candidate virtual speaker set; j=1, 2, . . . , and L, where L represents a quantity of representative coefficients; and i=1, 2, . . . , and I, where I represents the voting round quantity. The vote value $P_{jil}$ of the $l^{th}$ virtual speaker satisfies Formula (6).

$$P_{jil} = \log(E_{jil}) \text{ or } P_{jil} = E_{jil} \quad \text{Formula (6)}$$

$$E_{jil} = B_{ji}(\theta, \varphi) \cdot B_l(\theta, \varphi)$$

where θ represents a horizontal angle, φ represents a pitch angle, $B_{ji}(\theta,\varphi)$ represents the $j^{th}$ representative coefficient of the HOA signal, and $B_l(\theta,\varphi)$ represents the coefficient of the $l^{th}$ virtual speaker.

Then, the encoder 113 performs operation 2 to obtain, based on the vote values $P_{jil}$ of the Q virtual speakers, a virtual speaker corresponding to the $j^{th}$ representative coefficient in the $i^{th}$ round.

For example, a criterion for selecting the virtual speaker corresponding to the $j^{th}$ representative coefficient in the $i^{th}$ round is to select a virtual speaker with a largest absolute value of a vote value from the vote values of the Q virtual speakers for the $j^{th}$ representative coefficient in the $i^{th}$ round, where a number of the virtual speaker corresponding to the $j^{th}$ representative coefficient in the $i^{th}$ round is denoted as $g_{ji}$. When $l=g_{ji}$, $\text{abs}(P_{jig_{ji}})=\max(\text{abs}(P_{jil}))$.

If i is less than the voting round quantity I, that is, when the voting round quantity I is circularly completed, the encoder 113 performs operation 3 to subtract, from the to-be-encoded HOA signal of the $j^{th}$ representative coefficient, a coefficient of the virtual speaker selected for the $j^{th}$ representative coefficient in the $i^{th}$ round, and uses a remaining virtual speaker in the candidate virtual speaker set as a to-be-encoded HOA signal required for calculating a vote value of a virtual speaker for the $j^{th}$ representative coefficient in a next round. A coefficient of the remaining virtual speaker in the candidate virtual speaker set satisfies Formula (7).

$$B_j(\theta, \varphi) = B_j(\theta, \varphi) - w \cdot B_{gi,i}(\theta, \varphi) \cdot E_{jig} \quad \text{Formula (7)}$$

where $E_{jig}$ represents a vote value of the $l^{th}$ virtual speaker corresponding to the $j^{th}$ representative coefficient in the $i^{th}$ round; $B_{gj,i}(\theta,\varphi)$ on the right of the formula represents a coefficient of the to-be-encoded HOA signal of the $j^{th}$ representative coefficient in the $i^{th}$ round; $B_j(\theta,\varphi)$ on the left of the formula represents a coefficient of the to-be-encoded HOA signal of the $j^{th}$ representative coefficient in an $(i+1)^{th}$ round; w is a weight, and a preset value may satisfy $0 \le w \le 1$; and in addition, the weight may further satisfy Formula (8).

$$w = norm(B_{gi,j}(\theta, \varphi)) \quad \text{Formula (8)}$$

where "norm" is an operation of solving a 2-norm.

The encoder 113 performs operation 4, that is, the encoder 113 repeats operation 1 to operation 3 until a vote value of a virtual speaker corresponding to the it $j^{th}$ representative coefficient in each round is calculated.

The encoder 113 repeats operation 1 to operation 4 until vote values of virtual speakers corresponding to all representative coefficients in each round are calculated.

Finally, the encoder 113 calculates a final vote value of each virtual speaker for the current frame based on a number $g_{j,i}$ of the virtual speaker corresponding to each representative frequency in each round and the vote value $P_{jig_{j,i}}$, corresponding to the virtual speaker. For example, the encoder 113 accumulates vote values of virtual speakers with a same number, to obtain a final vote value of the virtual speaker for the current frame. The final vote value $VOTE_g$ of the virtual speaker for the current frame satisfies Formula (9).

$$VOTE_g = \sum P_{jig} \text{ or } VOTE_g = VOTE_g + P_{jig} \quad \text{Formula (9)}$$

Figure 8:
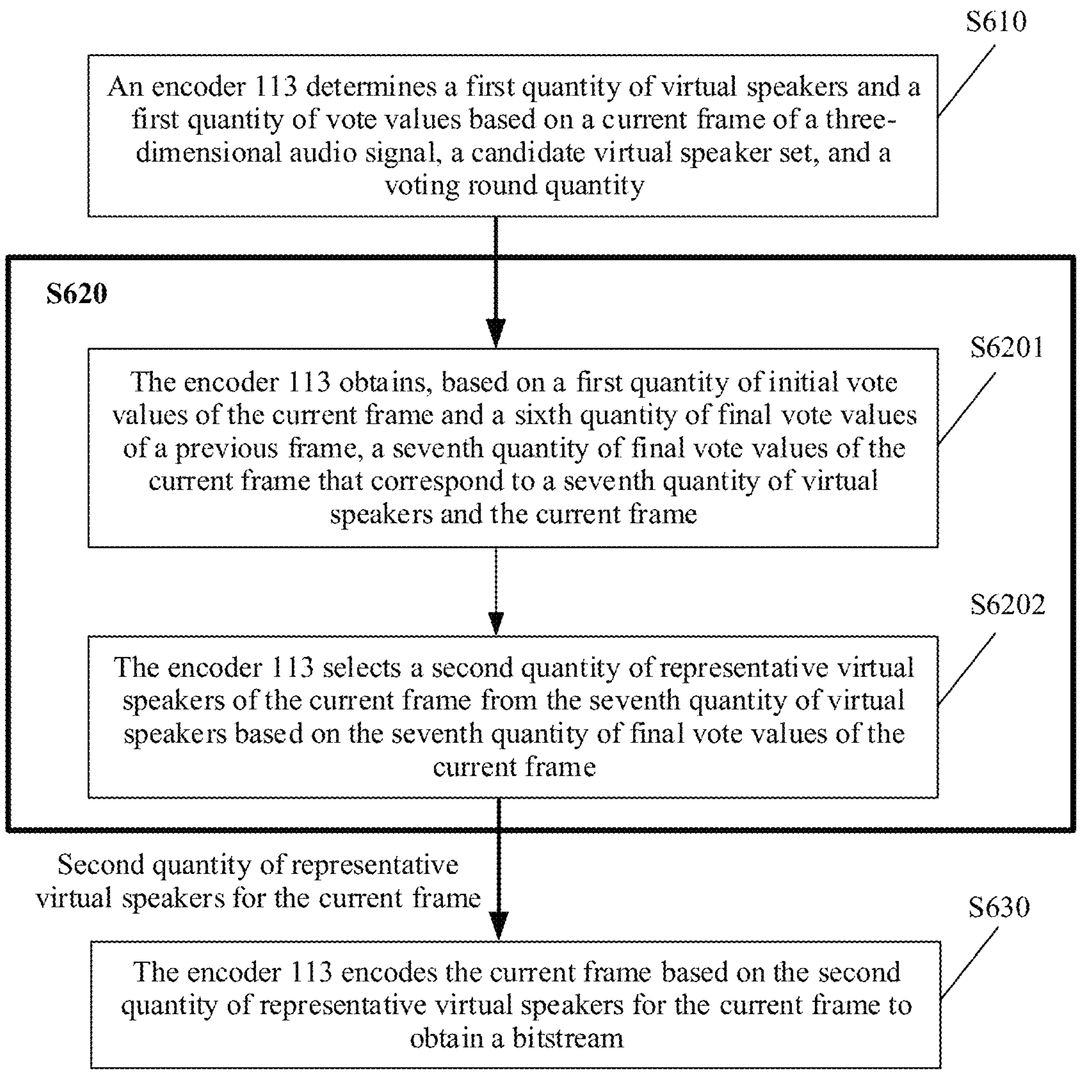
FIG. 8 is a schematic flowchart of another method for selecting a virtual speaker according to an embodiment of this application.

To increase orientation continuity between consecutive frames and overcome a problem that results of selecting virtual speakers for consecutive frames vary greatly, the encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame. FIG. 8 is a schematic flowchart of another method for selecting a virtual speaker according to an embodiment of this application. The method procedure in FIG. 8 describes a specific process included in S620 in FIG. 6.

S6201: The encoder 113 obtains, based on a first quantity of initial vote values of the current frame and a sixth quantity of final vote values of a previous frame, a seventh quantity of final vote values of the current frame that correspond to the seventh quantity of virtual speakers and the current frame.

The encoder 113 may determine the first quantity of virtual speakers and the first quantity of vote values based on the current frame of the three-dimensional audio signal, the candidate virtual speaker set, and the voting round quantity by using the method described in S610, and then use the first quantity of vote values as initial vote values of the current frame that correspond to the first quantity of virtual speakers.

The virtual speakers are in a one-to-one correspondence with the initial vote values of the current frame, that is, one virtual speaker corresponds to one initial vote value of the current frame. For example, the first quantity of virtual speakers include a first virtual speaker, the first quantity of initial vote values of the current frame include an initial vote value of the first virtual speaker for the current frame, and the first virtual speaker corresponds to the initial vote value of the first virtual speaker for the current frame. The initial vote value of the first virtual speaker for the current frame represents a priority of using the first virtual speaker when the current frame is encoded.

The sixth quantity of virtual speakers included in the representative virtual speaker set for the previous frame are in a one-to-one correspondence with the sixth quantity of final vote values of the previous frame. The sixth quantity of virtual speakers may be representative virtual speakers for the previous frame that are used by the encoder 113 to encode the previous frame of the three-dimensional audio signal.

Specifically, the encoder 113 updates the first quantity of initial vote values of the current frame based on the sixth quantity of final vote values of the previous frame. To be specific, the encoder 113 calculates a sum of the final vote values of the previous frame and initial vote values of the current frame that correspond to virtual speakers with a same number in the first quantity of virtual speakers and the sixth quantity of virtual speakers, to obtain the seventh quantity of final vote values of the current frame that are of the seventh quantity of virtual speakers and that correspond to the current frame.

S6202: The encoder 113 selects the second quantity of representative virtual speakers for the current frame from the seventh quantity of virtual speakers based on the seventh quantity of final vote values of the current frame.

The encoder 113 selects the second quantity of representative virtual speakers for the current frame from the seventh quantity of virtual speakers based on the seventh quantity of final vote values of the current frame, and final vote values of the current frame that correspond to the second quantity of representative virtual speakers for the current frame are greater than a preset threshold.

The encoder 113 may alternatively select the second quantity of representative virtual speakers for the current frame from the seventh quantity of virtual speakers based on the seventh quantity of final vote values of the current frame. For example, a second quantity of final vote values of the current frame are determined from the seventh quantity of final vote values of the current frame in descending order of the seventh quantity of final vote values of the current frame, and virtual speakers that are in the seventh quantity of virtual speakers and that are associated with the second quantity of final vote values of the current frame are used as the second quantity of representative virtual speakers for the current frame.

In an embodiment, if vote values of virtual speakers with different numbers in the seventh quantity of virtual speakers are the same, and the vote values of the virtual speakers with different numbers are greater than the preset threshold, the encoder 113 may use the virtual speakers with different numbers as representative virtual speakers for the current frame.

It should be noted that the second quantity is less than the seventh quantity. The seventh quantity of virtual speakers include the second quantity of representative virtual speakers for the current frame. The second quantity may be preset, or the second quantity may be determined based on a quantity of sound sources in a sound field of the current frame.

In addition, before the encoder 113 encodes a next frame of the current frame, if the encoder 113 determines to reuse the representative virtual speaker for the previous frame to encode the next frame, the encoder 113 may use the second quantity of representative virtual speakers for the current frame as a second quantity of representative virtual speakers for the previous frame, and encode the next frame of the current frame by using the second quantity of representative virtual speakers for the previous frame.

In a process of searching for a virtual speaker, because a location of a real sound source unnecessarily overlaps a location of the virtual speaker, the virtual speaker may be unable to form a one-to-one correspondence with the real sound source. In addition, in an actual complex scenario, a set with a limited quantity of virtual speakers may be unable to represent all sound sources in a sound field. In this case, virtual speakers found in different frames may frequently change, and this change obviously affects an auditory feeling of a listener, resulting in obvious discontinuity and noise in a three-dimensional audio signal obtained after decoding and reconstruction. According to the method for selecting a virtual speaker provided in this embodiment of this application, a representative virtual speaker for a previous frame is inherited, to be specific, for virtual speakers with a same number, an initial vote value of a current frame is adjusted by using a final vote value of the previous frame, so that the encoder more tends to select the representative virtual speaker for the previous frame, thereby reducing frequent changes of virtual speakers in different frames, enhancing signal orientation continuity between the frames, improving audio stability of a reconstructed three-dimensional audio signal, and ensuring sound quality of the reconstructed three-dimensional audio signal. In addition, a parameter is adjusted to ensure that the final vote value of the previous frame is not inherited for a long time, to prevent the algorithm from being unable to adapt to a scenario in which a sound field changes, such as a sound source movement scenario.

In addition, an embodiment of this application further provides a method for selecting a virtual speaker. The encoder may first determine whether the representative virtual speaker set for the previous frame can be reused to encode the current frame. If the encoder reuses the representative virtual speaker set for the previous frame to encode the current frame, the encoder does not perform a process of searching for a virtual speaker, which effectively reduces calculation complexity of searching for a virtual speaker by the encoder, thereby reducing calculation complexity of performing compression coding the three-dimensional audio signal and reducing calculation load of the encoder. If the encoder cannot reuse the representative virtual speaker set for the previous frame to encode the current frame, the encoder selects a representative coefficient, uses the representative coefficient of the current frame to vote for each virtual speaker in the candidate virtual speaker set, and selects a representative virtual speaker for the current frame based on a vote value, thereby reducing calculation complexity of performing compression coding the three-dimensional audio signal and reducing calculation load of the encoder. FIG. 9 is a schematic flowchart of a method for selecting a virtual speaker according to an embodiment of this application. Before the encoder 113 obtains the fourth quantity of coefficients of the current frame of the three-dimensional audio signal and the frequency-domain feature values of the fourth quantity of coefficients, that is, before S610, as shown in FIG. 9, the method includes the following operations.

S640: The encoder 113 obtains a first correlation between the current frame of the three-dimensional audio signal and a representative virtual speaker set for a previous frame.

The representative virtual speaker set for the previous frame includes a sixth quantity of virtual speakers, and the virtual speakers included in the sixth quantity of virtual speakers are representative virtual speakers for the previous frame that are used to encode the previous frame of the three-dimensional audio signal. The first correlation represents a priority of reusing the representative virtual speaker set for the previous frame when the current frame is encoded. The priority may also be replaced with a tendency, to be specific, the first correlation is used to determine whether to reuse the representative virtual speaker set for the previous frame when the current frame is encoded. It may be understood that a larger first correlation of the representative virtual speaker set for the previous frame indicates a higher tendency of the representative virtual speaker set for the previous frame, and the encoder 113 more tends to select a representative virtual speaker for the previous frame to encode the current frame.

S650: The encoder 113 determines whether the first correlation satisfies a reuse condition.

If the first correlation does not satisfy the reuse condition, it indicates that the encoder 113 more tends to search for a virtual speaker, encodes the current frame based on the representative virtual speaker for the current frame, and performs S610, to be specific, the encoder 113 obtains the fourth quantity of coefficients of the current frame of the three-dimensional audio signal and the frequency-domain feature values of the fourth quantity of coefficients.

In an embodiment, after selecting the third quantity of representative coefficients from the fourth quantity of coefficients based on the frequency-domain feature values of the fourth quantity of coefficients, the encoder 113 may use a largest representative coefficient in the third quantity of representative coefficients as a coefficient that is of the current frame and that is used to obtain the first correlation. In this case, the encoder 113 obtains a first correlation between the largest representative coefficient in the third quantity of representative coefficients of the current frame and the representative virtual speaker set for the previous frame. If the first correlation does not satisfy the reuse condition, S620 is performed, to be specific, the encoder 113 selects the second quantity of representative virtual speakers for the current frame from the first quantity of virtual speakers based on the first quantity of vote values.

If the first correlation satisfies the reuse condition, it indicates that the encoder 113 more tends to select the representative virtual speaker for the previous frame to encode the current frame, and the encoder 113 performs S660 and S670.

S660: The encoder 113 generates a virtual speaker signal based on the representative virtual speaker set for the previous frame and the current frame.

S670: The encoder 113 encodes the virtual speaker signal to obtain a bitstream.

According to the method for selecting a virtual speaker provided in this embodiment of this application, whether to search for a virtual speaker is determined by using a correlation between the representative coefficient of the current frame and the representative virtual speaker for the previous frame, which effectively reduces complexity of an encoder side while ensuring accuracy of selecting a correlation of the representative virtual speaker for the current frame.

It may be understood that, to implement the functions in the foregoing embodiments, the encoder includes corresponding hardware structures and/or software modules for performing the functions. A person skilled in the art should be easily aware that, units and method operations in the examples described with reference to embodiments disclosed in this application can be implemented in this application in a form of hardware or a combination of hardware and computer software. Whether a function is performed by hardware or hardware driven by computer software depends on particular application scenarios and design constraint conditions of the technical solutions.

Figure 10:
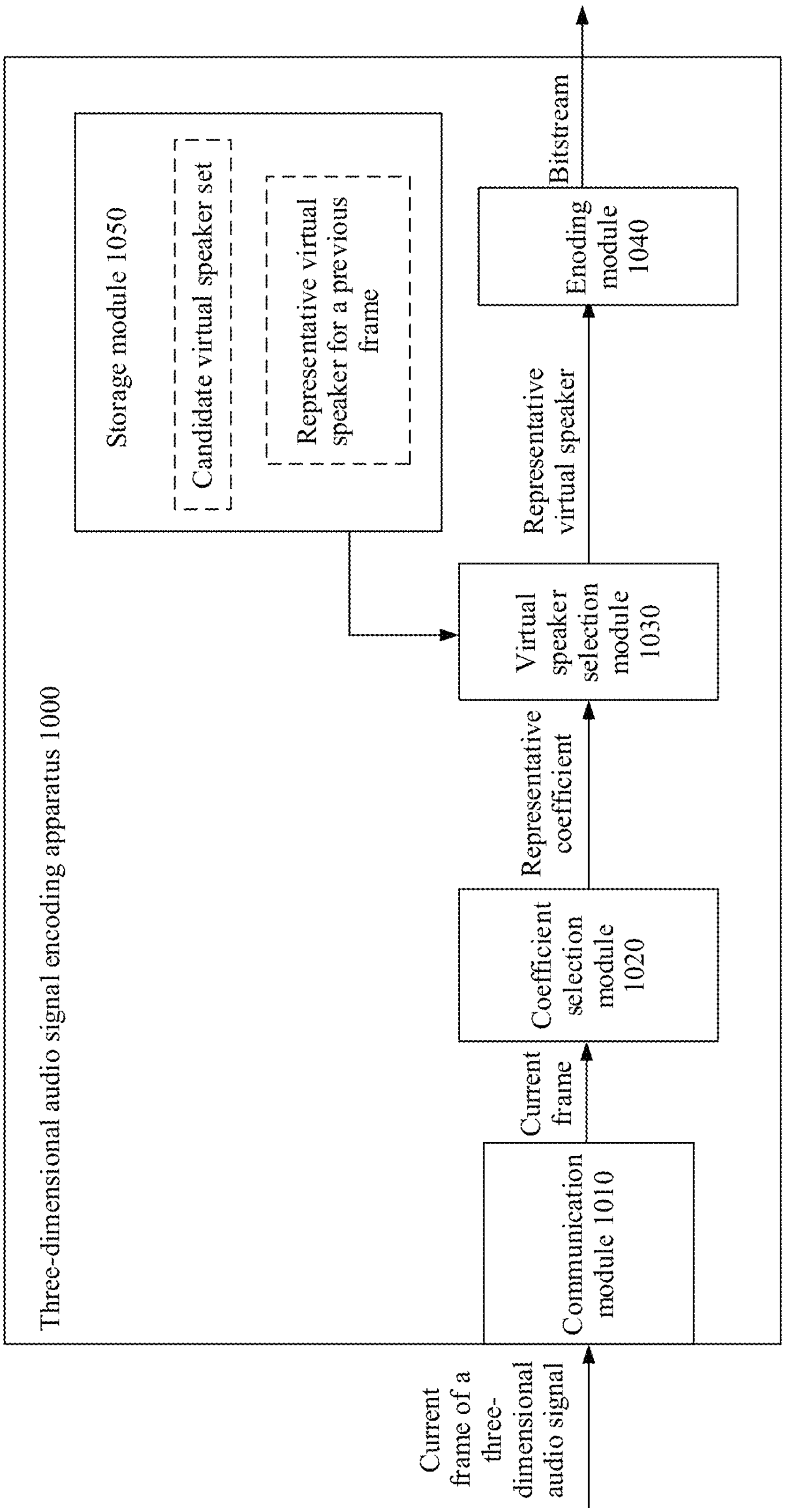
FIG. 10 is a schematic diagram of a structure of an encoding apparatus according to this application.
Figure 11:
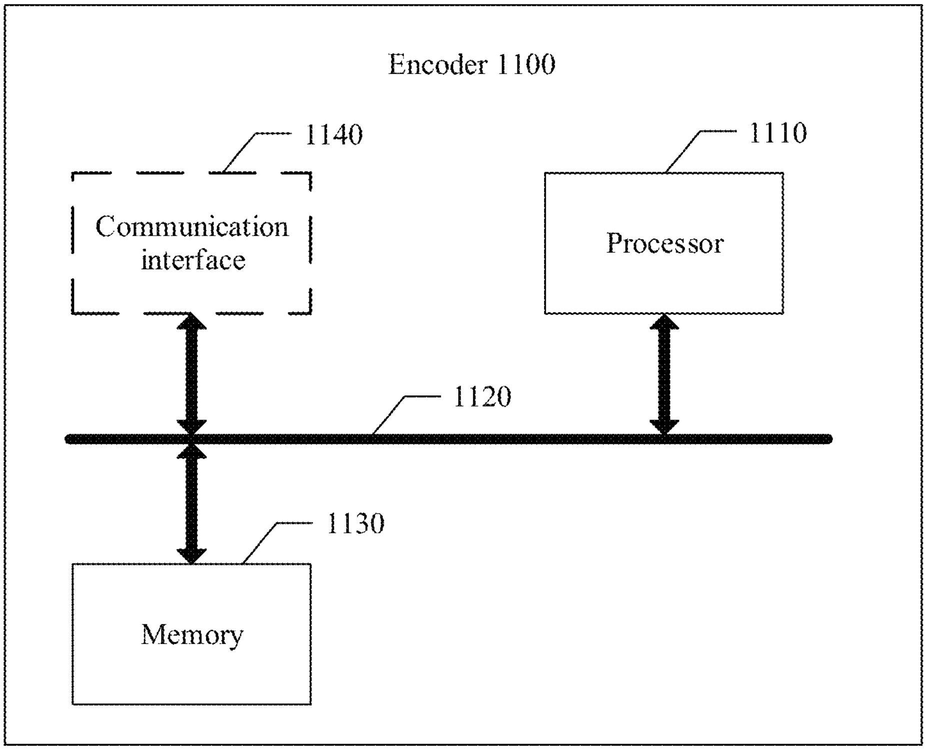
FIG. 11 is a schematic diagram of a structure of an encoder according to this application.

With reference to FIG. 1 to FIG. 9, the foregoing describes in detail the three-dimensional audio signal coding method provided in the embodiment. With reference to FIG. 10 and FIG. 11, the following describes a three-dimensional audio signal encoding apparatus and an encoder provided in embodiments.

FIG. 10 is a schematic diagram of a possible structure of a three-dimensional audio signal encoding apparatus according to an embodiment. The three-dimensional audio signal encoding apparatus may be configured to implement the function of encoding a three-dimensional audio signal in the foregoing method embodiments, and therefore can also implement the beneficial effects of the foregoing method embodiments. In this embodiment, the three-dimensional audio signal encoding apparatus may be the encoder 113 shown in FIG. 1, or the encoder 300 shown in FIG. 3, or may be a module (such as a chip) applied to a terminal device or a server.

As shown in FIG. 10, the three-dimensional audio signal encoding apparatus 1000 includes a communication module 1010, a coefficient selection module 1020, a virtual speaker selection module 1030, an encoding module 1040, and a storage module 1050. The three-dimensional audio signal encoding apparatus 1000 is configured to implement the functions of the encoder 113 in the method embodiments shown in FIG. 6 to FIG. 9.

The communication module 1010 is configured to obtain a current frame of a three-dimensional audio signal. In an embodiment, the communication module 1010 may alternatively receive the current frame of the three-dimensional audio signal obtained by another device, or obtain the current frame of the three-dimensional audio signal from the storage module 1050. The current frame of the three-dimensional audio signal is an HOA signal, a frequency-domain feature value of a coefficient is determined based on a two-dimensional vector, and the two-dimensional vector includes an HOA coefficient of the HOA signal.

The virtual speaker selection module 1030 is configured to determine a first quantity of virtual speakers and a first quantity of vote values based on the current frame of the three-dimensional audio signal, a candidate virtual speaker set, and a voting round quantity, where the virtual speakers are in a one-to-one correspondence with the vote values, the first quantity of virtual speakers include a first virtual speaker, the first quantity of vote values include a vote value of the first virtual speaker, the first virtual speaker corresponds to the vote value of the first virtual speaker, the vote value of the first virtual speaker represents a priority of using the first virtual speaker when the current frame is encoded, the candidate virtual speaker set includes a fifth quantity of virtual speakers, the fifth quantity of virtual speakers include the first quantity of virtual speakers, the voting round quantity is an integer greater than or equal to 1, and the voting round quantity is less than or equal to the fifth quantity.

The virtual speaker selection module 1030 is further configured to select a second quantity of representative virtual speakers for the current frame from the first quantity of virtual speakers based on the first quantity of vote values, where the second quantity is less than the first quantity.

The voting round quantity is determined based on at least one of the following: a quantity of directional sound sources in the current frame of the three-dimensional audio signal, a coding rate, and coding complexity. The second quantity is preset, or the second quantity is determined based on the current frame.

When the three-dimensional audio signal encoding apparatus 1000 is configured to implement the functions of the encoder 113 in the method embodiments shown in FIG. 6 to FIG. 9, the virtual speaker selection module 1030 is configured to implement related functions in S610 and S620.

For example, when selecting the second quantity of representative virtual speakers for the current frame from the first quantity of virtual speakers based on the first quantity of vote values, the virtual speaker selection module 1030 is configured to select the second quantity of representative virtual speakers for the current frame from the first quantity of virtual speakers based on the first quantity of vote values and a preset threshold.

For another example, when selecting the second quantity of representative virtual speakers for the current frame from the first quantity of virtual speakers based on the first quantity of vote values, the virtual speaker selection module 1030 is configured to: determine a second quantity of vote values from the first quantity of vote values in descending order of the first quantity of vote values, and use, as the second quantity of representative virtual speakers for the current frame, a second quantity of virtual speakers that are in the first quantity of virtual speakers and that are associated with the second quantity of vote values.

In an embodiment, when the three-dimensional audio signal encoding apparatus 1000 is configured to implement the functions of the encoder 113 in the method embodiment shown in FIG. 9, the virtual speaker selection module 1030 is configured to implement related functions in S640 and S670. Specifically, the virtual speaker selection module 1030 is further configured to: obtain a first correlation between the current frame and a representative virtual speaker set for a previous frame; and if the first correlation does not satisfy a reuse condition, obtain a fourth quantity of coefficients of the current frame of the three-dimensional audio signal and frequency-domain feature values of the fourth quantity of coefficients. The representative virtual speaker set for the previous frame includes a sixth quantity of virtual speakers, the virtual speakers included in the sixth quantity of virtual speakers are representative virtual speakers for the previous frame that are used to encode the previous frame of the three-dimensional audio signal, and the first correlation represents a priority of reusing the sixth quantity of virtual speakers when the current frame is encoded.

When the three-dimensional audio signal encoding apparatus 1000 is configured to implement the functions of the encoder 113 in the method embodiment shown in FIG. 8, the virtual speaker selection module 1030 is configured to implement a related function in S620. Specifically, when selecting the second quantity of representative virtual speakers for the current frame from the first quantity of virtual speakers based on the first quantity of vote values, the virtual speaker selection module 1030 is configured to: obtain, based on the first quantity of vote values and a sixth quantity of final vote values of the previous frame that are of the sixth quantity of virtual speakers included in the representative virtual speaker set for the previous frame and that correspond to the previous frame of the three-dimensional audio signal, a seventh quantity of final vote values of the current frame that correspond to the seventh quantity of virtual speakers and the current frame; and select the second quantity of representative virtual speakers for the current frame from the seventh quantity of virtual speakers based on the seventh quantity of final vote values of the current frame, where the second quantity is less than the seventh quantity. The seventh quantity of virtual speakers include the first quantity of virtual speakers, the seventh quantity of virtual speakers include the sixth quantity of virtual speakers, and the virtual speakers included in the sixth quantity of virtual speakers are representative virtual speakers for the previous frame that are used to encode the previous frame of the three-dimensional audio signal.

When the three-dimensional audio signal encoding apparatus 1000 is configured to implement the functions of the encoder 113 in the method embodiment shown in FIG. 7A and FIG. 7B, the coefficient selection module 1020 is configured to implement a related function in S6101. Specifically, when obtaining a third quantity of representative coefficients of the current frame, the coefficient selection module 1020 is configured to: obtain a fourth quantity of coefficients of the current frame and frequency-domain feature values of the fourth quantity of coefficients; and select the third quantity of representative coefficients from the fourth quantity of coefficients based on the frequency-domain feature values of the fourth quantity of coefficients, where the third quantity is less than the fourth quantity.

The encoding module 1040 is configured to encode the current frame based on the second quantity of representative virtual speakers for the current frame to obtain a bitstream.

When the three-dimensional audio signal encoding apparatus 1000 is configured to implement the functions of the encoder 113 in the method embodiments shown in FIG. 6 to FIG. 9, the encoding module 1040 is configured to implement a related function in S630. For example, the encoding module 1040 is configured to: generate a virtual speaker signal based on the second quantity of representative virtual speakers for the current frame and the current frame; and encode the virtual speaker signal to obtain the bitstream.

The storage module 1050 is configured to store a coefficient related to the three-dimensional audio signal, the candidate virtual speaker set, the representative virtual speaker set for the previous frame, the selected coefficient and virtual speaker, and the like, so that the encoding module 1040 encodes the current frame to obtain the bitstream, and transmits the bitstream to a decoder.

It should be understood that the three-dimensional audio signal encoding apparatus 1000 in this embodiment of this application may be implemented by using an application-specific integrated circuit (ASIC) or a programmable logic device (PLD). The PLD may be a complex programmable logical device (CPLD), a field-programmable gate array (FPGA), generic array logic (GAL), or any combination thereof. When the three-dimensional audio signal encoding method shown in FIG. 6 to FIG. 9 is implemented by using software, the three-dimensional audio signal encoding apparatus 1000 and the modules of the three-dimensional audio signal encoding apparatus 1000 may alternatively be software modules.

For more detailed descriptions of the communication module 1010, the coefficient selection module 1020, the virtual speaker selection module 1030, the encoding module 1040, and the storage module 1050, directly refer to related descriptions in the method embodiments shown in FIG. 6 to FIG. 9. Details are not described herein again.

FIG. 11 is a schematic diagram of a structure of an encoder 1100 according to an embodiment. As shown in FIG. 11, the encoder 1100 includes a processor 1110, a bus 1120, a memory 1130, and a communication interface 1140.

It should be understood that in this embodiment, the processor 1110 may be a central processing unit (CPU), or the processor 1110 may be another general-purpose processor, a digital signal processor (DSP), an ASIC, an FPGA or another programmable logic device, a discrete gate or transistor logic device, a discrete hardware component, or the like. The general-purpose processor may be a microprocessor, or may be any conventional processor or the like.

The processor may alternatively be a graphics processing unit (GPU), a neural network processing unit (NPU), a microprocessor, or one or more integrated circuits configured to control program execution of the solutions in this application.

The communication interface 1140 is configured to implement communication between the encoder 1100 and an external device or component. In this embodiment, the communication interface 1140 is configured to receive a three-dimensional audio signal.

The bus 1120 may include a channel, configured to transmit information between the foregoing components (for example, the processor 1110 and the memory 1130). In addition to a data bus, the bus 1120 may further include a power bus, a control bus, a status signal bus, and the like.

However, for clear description, various types of buses are marked as the bus 1120 in the figure.

For example, the encoder 1100 may include a plurality of processors. The processor may be a multi-core (multi-CPU) processor. The processor herein may be one or more devices, circuits, and/or calculation units configured to process data (for example, computer program instructions). The processor 1110 may invoke a coefficient related to the three-dimensional audio signal, a candidate virtual speaker set, a representative virtual speaker set for a previous frame, and a selected coefficient and virtual speaker that are stored in the memory 1130.

It should be noted that in FIG. 11, only an example in which the encoder 1100 includes one processor 1110 and one memory 1130 is used. Herein, the processor 1110 and the memory 1130 each indicate a type of component or device. In a specific embodiment, a quantity of components or devices of each type may be determined based on a service requirement.

The memory 1130 may correspond to a storage medium, for example, a magnetic disk such as a mechanical hard disk or a solid state disk, configured to store information such as the coefficient related to the three-dimensional audio signal, the candidate virtual speaker set, the representative virtual speaker set for the previous frame, and the selected coefficient and virtual speaker in the foregoing method embodiments.

The encoder 1100 may be a general-purpose device or a dedicated device. For example, the encoder 1100 may be an X86-based server or an ARM-based server, or may be another dedicated server such as a policy control and charging (PCC) server. A type of the encoder 1100 is not limited in this embodiment of this application.

It should be understood that the encoder 1100 according to this embodiment may correspond to the three-dimensional audio signal encoding apparatus 1000 in embodiments, and may correspond to a corresponding body configured to perform any of the methods in FIG. 6 to FIG. 9. In addition, the foregoing and other operations and/or functions of the modules in the three-dimensional audio signal encoding apparatus 1000 are respectively used to implement corresponding procedures of the methods in FIG. 6 to FIG. 9. For brevity, details are not described herein again.

The method operations in embodiments may be implemented by hardware, or may be implemented by a processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. An example storage medium is coupled to the processor, so that the processor can read information from the storage medium and can write information into the storage medium. Certainly, the storage medium may be a component of the processor. The processor and the storage medium may be located in an ASIC. In addition, the ASIC may be located in a network device or a terminal device. Certainly, the processor and the storage medium may exist in a network device or a terminal device as discrete components.

All or some of the foregoing embodiments may be implemented by using software, hardware, firmware, or any combination thereof. When software is used for embodiment, embodiments may be entirely or partially implemented in a form of a computer program product. The computer program product includes one or more computer programs or instructions. When the computer programs or the instructions are loaded and executed on a computer, all or some of the procedures or functions according to embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from one computer-readable storage medium to another computer-readable storage medium. For example, the computer programs or the instructions may be transmitted from one website, computer, server, or data center to another website, computer, server, or data center in a wired or wireless manner. The computer-readable storage medium may be any available medium accessible by a computer or a data storage device, such as a server or a data center, that integrates one or more available media. The available medium may be a magnetic medium, for example, a floppy disk, a hard disk, or a magnetic tape; may be an optical medium, for example, a digital video disc (DVD); or may be a semiconductor medium, for example, a solid state drive (SSD).

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by an encoder, for encoding three-dimensional (3D) audio signals, comprising:

determining a first quantity of virtual speakers and a first quantity of vote values corresponding to the first quantity of virtual speakers respectively, based on a current frame of a 3D audio signal, a candidate virtual speaker set, and a voting round quantity, wherein the first quantity of virtual speakers comprise a first virtual speaker, a vote value of the first virtual speaker represents a priority for selecting the first virtual speaker when the current frame is encoded by the encoder, the candidate virtual speaker set comprises a fifth quantity of virtual speakers that include the first quantity of virtual speakers, the first quantity is less than or equal to the fifth quantity, the voting round quantity is determined based on a coding rate at which the encoder encodes the current frame and/or a coding application scenario, and the voting round quantity is an integer greater than or equal to 1, and the voting round quantity is less than or equal to the fifth quantity;

selecting a second quantity of representative virtual speakers for the current frame from the first quantity of virtual speakers based on the first quantity of vote values, wherein the second quantity is less than the first quantity;

encoding the current frame based on the second quantity of representative virtual speakers for the current frame to obtain a compressed version of the current frame; and incorporating the compressed version of the current frame into a bitstream which is a compressed version of the 3D audio signal.

2. The method according to claim 1, wherein the voting round quantity is determined further based on a coding complexity of encoding the current frame.

3. The method according to claim 1, wherein the voting round quantity is determined further based on a quantity of directional sound sources in the current frame of the 3D audio signal.

4. The method according to claim 1, wherein selecting the second quantity of representative virtual speakers for the current frame comprises:

selecting the second quantity of representative virtual speakers for the current frame from the first quantity of virtual speakers based on the first quantity of vote values and a preset threshold.

5. The method according to claim 1, wherein selecting the second quantity of representative virtual speakers for the current frame comprises:

determining a second quantity of vote values from the first quantity of vote values based on the first quantity of vote values, wherein the second quantity of vote values correspond to a second quantity of virtual speakers in the first quantity of virtual speakers representing second quantity of representative virtual speakers for the current frame.

6. The method according to claim 1, wherein when the first quantity is equal to the fifth quantity, determining a first quantity of virtual speakers and a first quantity of vote values comprises:

obtaining a third quantity of representative coefficients of the current frame that comprise a first representative coefficient and a second representative coefficient;

obtaining a fifth quantity of first vote values of the fifth quantity of virtual speakers that are obtained by performing the voting round quantity of rounds of voting using the first representative coefficient, wherein the fifth quantity of first vote values comprise a first vote value of the first virtual speaker;

obtaining a fifth quantity of second vote values of the fifth quantity of virtual speakers that are obtained by performing the voting round quantity of rounds of voting using the second representative coefficient, wherein the fifth quantity of second vote values comprise a second vote value of the first virtual speaker; and obtaining respective vote values of the fifth quantity of virtual speakers based on the fifth quantity of first vote values and the fifth quantity of second vote values, wherein the vote value of the first virtual speaker is obtained based on the first vote value of the first virtual speaker and the second vote value of the first virtual speaker.

7. The method according to claim 1, wherein when the first quantity is less than or equal to the fifth quantity, determining a first quantity of virtual speakers and a first quantity of vote values comprises:

obtaining a third quantity of representative coefficients of the current frame, wherein the third quantity of representative coefficients comprise a first representative coefficient and a second representative coefficient;

obtaining a fifth quantity of first vote values of the fifth quantity of virtual speakers that are obtained by performing the voting round quantity of rounds of voting using the first representative coefficient, wherein the fifth quantity of first vote values comprise a first vote value of the first virtual speaker;

obtaining a fifth quantity of second vote values of the fifth quantity of virtual speakers that are obtained by performing the voting round quantity of rounds of voting using the second representative coefficient, wherein the fifth quantity of second vote values comprise a second vote value of the first virtual speaker;

selecting an eighth quantity of virtual speakers from the fifth quantity of virtual speakers based on the fifth quantity of first vote values, wherein the eighth quantity is less than the fifth quantity;

selecting a ninth quantity of virtual speakers from the fifth quantity of virtual speakers based on the fifth quantity of second vote values, wherein the ninth quantity is less than the fifth quantity;

obtaining a tenth quantity of third vote values of a tenth quantity of virtual speakers based on first vote values of the eighth quantity of virtual speakers and second vote values of the ninth quantity of virtual speakers, wherein the eighth quantity of virtual speakers comprise the tenth quantity of virtual speakers, the ninth quantity of virtual speakers comprise the tenth quantity of virtual speakers, the tenth quantity of virtual speakers comprise a second virtual speaker, a third vote value of the second virtual speaker is obtained based on a first vote value of the second virtual speaker and a second vote value of the second virtual speaker, the tenth quantity is less than or equal to the eighth quantity, the tenth quantity is less than or equal to the ninth quantity, and the tenth quantity is an integer greater than or equal to 1; and obtaining the first quantity of virtual speakers and the first quantity of vote values based on the first vote values of the eighth quantity of virtual speakers, the second vote values of the ninth quantity of virtual speakers, and the tenth quantity of third vote values, wherein the first quantity of virtual speakers comprise the eighth quantity of virtual speakers and the ninth quantity of virtual speakers.

8. The method according to claim 1, wherein when the first quantity is less than or equal to the fifth quantity, determining a first quantity of virtual speakers and a first quantity of vote values comprises:

obtaining a third quantity of representative coefficients of the current frame, wherein the third quantity of representative coefficients comprise a first representative coefficient and a second representative coefficient;

obtaining a fifth quantity of first vote values of the fifth quantity of virtual speakers that are obtained by performing the voting round quantity of rounds of voting using the first representative coefficient, wherein the fifth quantity of first vote values comprise a first vote value of the first virtual speaker;

obtaining a fifth quantity of second vote values of the fifth quantity of virtual speakers that are obtained by performing the voting round quantity of rounds of voting using the second representative coefficient, wherein the fifth quantity of second vote values comprise a second vote value of the first virtual speaker;

selecting an eighth quantity of virtual speakers from the fifth quantity of virtual speakers based on the fifth quantity of first vote values, wherein the eighth quantity is less than the fifth quantity;

selecting a ninth quantity of virtual speakers from the fifth quantity of virtual speakers based on the fifth quantity of second vote values, wherein the ninth quantity is less than the fifth quantity, and there is no overlap between the eighth quantity of virtual speakers and the ninth quantity of virtual speakers; and obtaining the first quantity of virtual speakers and the first quantity of vote values based on first vote values of the eighth quantity of virtual speakers and second vote values of the ninth quantity of virtual speakers, wherein the first quantity of virtual speakers comprise the eighth quantity of virtual speakers and the ninth quantity of virtual speakers.

9. The method according to claim 6, wherein obtaining a fifth quantity of first vote values of the fifth quantity of virtual speakers comprises:

determining the fifth quantity of first vote values based on coefficients of the fifth quantity of virtual speakers and the first representative coefficient.

10. The method according to claim 6, wherein the obtaining the third quantity of representative coefficients of the current frame comprises:

obtaining a fourth quantity of coefficients of the current frame and frequency-domain feature values of the fourth quantity of coefficients; and selecting the third quantity of representative coefficients from the fourth quantity of coefficients based on the frequency-domain feature values of the fourth quantity of coefficients, wherein the third quantity is less than the fourth quantity.

11. The method according to claim 10, wherein before selecting the third quantity of representative coefficients from the fourth quantity of coefficients, the method further comprises:

obtaining a first correlation between the current frame and a representative virtual speaker set for a previous frame, wherein the representative virtual speaker set for the previous frame comprises a sixth quantity of virtual speakers that are representative virtual speakers for the previous frame used to encode the previous frame of the 3D audio signal, and the first correlation is used to determine whether to reuse the representative virtual speaker set for the previous frame when the current frame is encoded; and if the first correlation does not satisfy a reuse condition, obtaining the fourth quantity of coefficients of the current frame of the 3D audio signal and the frequency-domain feature values of the fourth quantity of coefficients.

12. The method according to claim 1, wherein selecting the second quantity of representative virtual speakers for the current frame comprises:

obtaining, based on the first quantity of vote values and a sixth quantity of final vote values of the previous frame, a seventh quantity of final vote values of the current frame that correspond to the seventh quantity of virtual speakers and the current frame, wherein a seventh quantity of virtual speakers comprise the first quantity of virtual speakers, the seventh quantity of virtual speakers comprise a sixth quantity of virtual speakers, the sixth quantity of virtual speakers comprised in the representative virtual speaker set for the previous frame are in a one-to-one correspondence with the sixth quantity of final vote values of the previous frame, and the sixth quantity of virtual speakers are virtual speakers used when the previous frame of the 3D audio signal is encoded; and selecting the second quantity of representative virtual speakers for the current frame from the seventh quantity of virtual speakers based on the seventh quantity of final vote values of the current frame, wherein the second quantity is less than the seventh quantity.

13. The method according to claim 1, wherein the current frame of the 3D audio signal is a higher order ambisonics (HOA) signal, and a frequency-domain feature value of a coefficient of the current frame is determined based on a coefficient of the HOA signal.

14. An encoder, comprising:

at least one processor and a memory to store a computer program, which when executed by the at least one processor, cause the processor to:

determine a first quantity of virtual speakers and a first quantity of vote values corresponding to the first quantity of virtual speakers respectively, based on a current frame of a 3D audio signal, a candidate virtual speaker set, and a voting round quantity, wherein the first quantity of virtual speakers comprise a first virtual speaker, a vote value of the first virtual speaker represents a priority for selecting the first virtual speaker when the current frame is encoded by the encoder, the candidate virtual speaker set comprises a fifth quantity of virtual speakers that comprise the first quantity of virtual speakers, the first quantity is less than or equal to the fifth quantity, the voting round quantity is determined based on a coding rate at which the encoder encodes the current frame and/or a coding application scenario, and the voting round quantity is an integer greater than or equal to 1, and the voting round quantity is less than or equal to the fifth quantity;

select a second quantity of representative virtual speakers for the current frame from the first quantity of virtual speakers based on the first quantity of vote values, wherein the second quantity is less than the first quantity;

encode the current frame based on the second quantity of representative virtual speakers for the current frame to obtain a compressed version of the current frame; and incorporate the compressed version of the current frame into a bitstream which is a compressed version of the 3D audio signal.

15. The encoder according to claim 14, wherein the voting round quantity is determined based on at least one of the following: a coding rate at which the current frame is encoded, or coding complexity of encoding the current frame.

16. The encoder according to claim 14, wherein the voting round quantity is determined based on a quantity of directional sound sources in the current frame of the 3D audio signal.

17. The encoder according to claim 14, wherein to select the second quantity of representative virtual speakers for the current frame comprises to:

select the second quantity of representative virtual speakers for the current frame from the first quantity of virtual speakers based on the first quantity of vote values and a preset threshold.

18. The encoder according to claim 14, wherein to select the second quantity of representative virtual speakers for the current frame comprises to:

determine a second quantity of vote values from the first quantity of vote values based on the first quantity of vote values, wherein a second quantity of virtual speakers that are in the first quantity of virtual speakers and that correspond to the second quantity of vote values are the second quantity of representative virtual speakers for the current frame.

19. A system, comprising the encoder according to claim 14 and a decoder, wherein the decoder is configured to decode the bitstream generated by the encoder.

20. A non-transitory computer-readable storage medium, comprising a bitstream obtained in a three-dimensional (3D) audio signal encoding method, the method comprising:

determining a first quantity of virtual speakers and a first quantity of vote values corresponding to the a first quantity of virtual speakers, based on a current frame of a three-dimensional audio signal, a candidate virtual speaker set, and a voting round quantity, wherein the first quantity of virtual speakers comprise a first virtual speaker, a vote value of the first virtual speaker represents a priority for selecting the first virtual speaker when the current frame is encoded by the encoder, the candidate virtual speaker set comprises a fifth quantity of virtual speakers that comprise the first quantity of virtual speakers, the first quantity is less than or equal to the fifth quantity, the voting round quantity is determined based on a coding rate at which the encoder encodes the current frame and/or a coding application scenario, and the voting round quantity is an integer greater than or equal to 1, and the voting round quantity is less than or equal to the fifth quantity;

selecting a second quantity of representative virtual speakers for the current frame from the first quantity of virtual speakers based on the first quantity of vote values, wherein the second quantity is less than the first quantity;

encoding the current frame based on the second quantity of representative virtual speakers for the current frame to obtain a compressed version of the current frame; and incorporating the compressed version of the current frame into a bitstream which is a compressed version of the 3D audio signal.

* * * * *